United States Patent [19]

Sherman

[11] Patent Number: 5,543,940
[45] Date of Patent: Aug. 6, 1996

[54] METHOD AND APPARATUS FOR CONVERTING COLOR SCANNER SIGNALS INTO COLORIMETRIC VALUES

[75] Inventor: Doron Sherman, Palo Alto, Calif.

[73] Assignee: Electronics For Imaging, San Mateo, Calif.

[21] Appl. No.: 190,871

[22] Filed: Feb. 2, 1994

[51] Int. Cl.$^6$ .................................................. G02F 1/1333
[52] U.S. Cl. ........................... 358/518; 358/524; 358/528
[58] Field of Search .................................... 358/518, 519, 358/524, 525, 526, 527, 528, 529

[56] References Cited

U.S. PATENT DOCUMENTS

| | | |
|---|---|---|
| 4,500,919 | 2/1985 | Schreiber . |
| 4,977,522 | 12/1990 | David . |
| 4,992,963 | 2/1991 | Funt et al. . |
| 5,003,500 | 3/1991 | Gerber . |
| 5,149,960 | 9/1992 | Dunne et al. . |
| 5,377,025 | 12/1994 | Spaulding ............................. 358/518 |

FOREIGN PATENT DOCUMENTS 562971  9/1993  European Pat. Off. .

OTHER PUBLICATIONS

Pratt and Mancill, *Spectral Estimation Techniques for the Spectral Calibration of a Color Image Scanner*, 15 Applied Optics 1, 73–75 (Jan. 1976).
Cohen, *Dependency of the Spectral Reflectance Curves of the Munsell Color Chips*, 1 Psychon. Sci. (1964).
Maloney, *Evaluation of Linear Models of Surface Spectral Reflectance with Small Numbers of Parameters*, 3 Journal of the Optical Society of America 10, 1673–1683 (Oct. 1986).
Vrhel and Trussell, *Color Correction Using Principal Components*, 17 Color Research and Application 5, 328–338 (Oct. 1992).
Lee, *Colorimetric Calibration of a Video Digitizing System: Algorithm and Applications*, 13 Color Research and Application 3, 180–186 (Jun. 1988).

Kang, *Color Scanner Calibration*, 36 Journal of Imaging Science and Technology 2, 162–170 (Mar./Apr. 1992).
Po-Chieh, *Colorimetric Calibration for Scanners and Media*, 11 pages, no date shown.
Mancill, C. E., *Digital Color Image Restoration*, ii–143 (Aug. 1975).
Brain A. Wandell, *Color Rendering of Color Camera Data*, 1986 pp. S30–S33.

(List continued on next page.)

*Primary Examiner*—Sandra L. O'Shea
*Assistant Examiner*—John Ning
*Attorney, Agent, or Firm*—Blakely, Sokoloff, Taylor & Zafman

[57] ABSTRACT

A method and apparatus for reconstructing a spectrum realizable in a medium from signals of a color scanner, includes the steps of obtaining an initial spectrum using a linear vector-space representation of the medium spectra, projecting the initial spectrum onto a logarithmic vector-space representation of the medium spectra to obtain an initial set of coordinates in the logarithmic vector-space and modifying the initial coordinates in an iterative convergence loop until a solution criterion is met. The solved coordinates are then transformed into spectrum using the logarithmic vector-space representation and subsequently may be transformed into colorimetric values. The method and apparatus of this invention thus enable conversion of color scanner signals into colorimetric values. This is accomplished without modification of the prevailing scanner elements. In one embodiment, the method comprises selecting a specific medium and a specific scanner, constructing a medium model for the selected medium, constructing a scanner model for the selected scanner, iteratively using the media model and the scanner model to solve for a spectral function representative of a color input, and converting the spectral function into a colorimetric value representative of the color input. The method may be performed in a digital processing system including a memory, a processor such as a CPU, a scanner for receiving the medium and scanning the media to provide the color input, and a printer for reproducing the colorimetric value.

30 Claims, 15 Drawing Sheets

OTHER PUBLICATIONS

Win–Chyi Chang, et al. "Camera and Input Scanner Systems", SPIE—The International Society for Optical Engineering, Proceeding Series, vol. 1448, pp. 164–174.

M. J. Vrhel, et al., "Color Correction Using Principal Components", John Wiley & Sons, vol. 17, No. 5, Oct. 1992, pp. 328–338.

B. Petschik, "Non–Linear Color Correction Algorithms for Hard Copy", Sixth International Conference on Advances in Non–Impact Printing Technologies, Proceedings, pp. 803–810.

METHOD AND APPARATUS FOR CONVERTING COLOR SCANNER SIGNALS INTO COLORIMETRIC VALUES

FIELD OF THE INVENTION

The present invention relates generally to color reproduction and in particular to scanner calibration and a method and apparatus for converting scanner signals into colorimetric signals.

BACKGROUND OF THE INVENTION

Scanners vs. Colorimeters

Scanners are used to rapidly convert the color information at all points on an original transparency or print into an array of picture elements (pixels) to form a digital or computer image, each pixel represented by a digital color value. The digital image typically is used either for further processing by a computer or for conversion to colorant values such as ink densities as in a color separation scanner or color reproduction system. Colorimeters typically are used to measure the color information at individual points on an original. Typically, colorimeters provide calibrated color information, while scanners provide approximate uncalibrated color information. It is desirable to obtain calibrated color information by using an image scanner to scan a complete image in one operation.

Obtaining colorimetric values of a color original, for example in a CIE-based color space, allows many tasks of color reproduction to be carried out more effectively and easily. These tasks include soft-proofing—that is, reproducing the color on a display (such as a CRT), gamut mapping— that is, altering the range of color across different media, tone scaling and other image processing and manipulation processes.

Standardizing colorimetry had been carried out by several committees of the CIE Commission during the past few decades, such as the 1931 and 1976 committees. The CIE had mainly dealt with standardizing colorimetric entities, such as colorimetric matching functions, standard illuminants and standard observers, and colorimetric procedures, such as computation of color coordinates and color differences in various color spaces.

The usefulness of calibrated scanning, that is, of exact colorimetric values in representing color, is demonstrated by the recent rapid popularity of color reproduction systems that use device-independent methods, such as disclosed by Schreiber in U.S. Pat. No. 4,500,919. While color reproduction systems based on device-independent color such as disclosed by Schreiber work with approximately colorimetric values, better results are obtained the closer scanned values are to exact colorimetric values.

Today's Scanners Typically are Roughly Colorimetric

Obtaining such colorimetric values by scanning is called colorimetric scanning or synonymously, calibrated scanning. Colorimetric scanning can be performed by using red, green and blue filters having spectral responses corresponding to colorimetric matching functions. The resulting scanner signals represent substantially the original color in terms of exact colorimetric values. However, building such a scanner is a relatively expensive and difficult task, requiring careful design and selection of scanner components. Most of today's scanners, as a result, are only roughly colorimetric.

It is thus desirable to find methods for converting signals of a roughly colorimetric scanner to colorimetric values. That is, methods for calibrating scanners.

Ad-Hoc Empirical Methods for Calibrating Roughly Colorimetric Scanners

Converting signals of a roughly colorimetric scanner using a linear transformation result in a better approximation to the exact colorimetric values of the original color. Such a method was described by Kang in "Color Scanner Calibration," *Journal of Imaging Science and Technology,* volume 36, number 2, pages 162–170, March–April 1992. The linear transformations, and other higher-order transformations suggested by Kang are based on empirically fitting certain functional forms to describe the relationship between scanner signals and exact colorimetric values using a set of measured color samples. Such methods are sensitive to the choice of color samples and tend to possess a lower accuracy for colors not present in the training set.

A method using a lookup table (LUT) loaded with empirically determined data, such as described by Hung in "Colorimetric Calibration for Scanners and Media," *Proceedings SPIE,* volume 1448, pages 164–174, 1991, uses similar color samples as a training set together with interpolation and extrapolation techniques. However, this method, as well as others that load lookup tables using empirically determined data, must compute all entries for the LUT experimentally and manipulate them as an inter-dependent set using ad-hoc techniques.

Roughly colorimetric scanners, in contrast to exact colorimetric scanners, exhibit an eye-versus-scanner metamerism effect. That is, color samples of identical colorimetric values but from different media types, such as photographic prints using different stock, or prints and transparencies, give rise to different scanner signals. Hence, a satisfying transformation developed for one medium type, say a print on one type of photographic paper might be inadequate for another. For this reason, empirically determined transformations must use training sets of color samples made of various media types. This is potentially an exhaustive and complicated task. One reason is that the type of an original medium is usually identified not only by the components of which it is comprised, but also by the process used to create the original color. For example, the type of a photographic reflection print may be determined by the paper stock, the development process and the finish type (e.g. glossy or matte). Types of other scanned media may be identified by such or different attributes.

Methods Based on Film Modeling

Dunne and Stockham disclose a conversion method in U.S. Pat. No. 5,149,960 based on modeling of film using a mixing model for its colorants. Colorants are the components of a medium that create different colors by being present in different amounts. Examples of colorants include inks used in a printing press, and layered dyes used in photographic film. The Dunne and Stockham method computes a set of colorant amounts required to reproduce in a medium the color obtained by the scanner scanning an image. The computed colorant amounts are then further converted into exact colorimetric values. A similar method also was presented by Mancill in "Digital Color Image Restoration," *Ph.D. Dissertation,* University of Southern California, Los Angeles, August 1975.

The Dunne/Stockham/Mancill method requires knowledge of the spectral distributions, expressed in density units, of the individual colorants of the medium of interest. To quote from the Dunne and Stockham patent, "While the method of the present invention requires knowledge of the spectral density of film dyes or other colorants that are used to produce the colored original, it is believed that this limitation is outweighed by the fact that colorimetric data may be found without requiring modification of existing scanner filters," U.S. Pat. No. 5,149,960, column 10, lines 40–45. The spectral densities are needed to calculate the spectral distribution of the color at the pixel scanned. Another limitation of the Dunne/Stockham/Mancill method is the need to assume a mixing model.

The particular mixing model assumed is that the density spectrum of the color at a pixel is determined by a weighted sum of the known density spectral distributions of the colorants, the weights being the respective amounts of a colorant. These colorant amounts are the parameters in the model to be determined from the scanner output. Typical scanners have three outputs, red green and blue, and the model disclosed in the patent was for three dyes suspended in a film to form a transparency, leading to three parameters to be determined from three measurements. The model assumption limits the method to those media for which this and similar mixing model holds. Thus such a method is not likely to provide high accuracy for media types other than film stock as determining accurate colorant mixing models is currently an open research problem. The well known Neugebauer equations for four color lithographic printing are known to be inaccurate. Even the Neugebauer equations are complicated compared to the simple linear additive models used in the Dunne/Stockham/Mancill method, so that it is not at all dear how one would extend the methods when there are complicated models, and in the case of four-color printing, four parameters to be determined from three measurements. Moreover, it is not clear how one would expand then solve the models for media having various substrates, such as the cases of inks printed on different papers, various finish qualities, (e.g., matte and glossy), and other media attributes.

Methods Based on Simplified Models

Several results have led to attempts at simplified models. Cohen in "Dependency of the Spectral Reflectance Curves of Munsell Color Chips," *Psychonomic Science*, volume 1, pages 369–370, 1964, showed that empirical spectral reflectance functions of natural surfaces are highly correlated and may be efficiently represented as a linear combination of only a few basis spectral functions. This representation is based on a vector-space approach which is well-known in matrix algebra. Maloney in "Evaluation of Linear Models of Surface Spectral Reflectance with Small Numbers of Parameters," *Journal of the Optical Society of America A*, volume 3, number 10, pages 1673–1683, October 1986, showed that such spectra fall within a linear model composed of band-limited functions, with as few as five to seven basis spectral functions. However, the dimension of the original color spectra must be effectively restricted to the number of scanner channels, usually three, in order to obtain unique solutions. Without such a restriction, an infinite number of different colors may correspond to the same instance of scanner signals.

Wandell in "Color Rendering of Camera Data," *Color Research and Application Supplement*, volume 11, pages S30–S33, 1986, Vrhel and Trussell in "Color Correction Using Principal Components," *Color Research and Application*, volume 17, number 5, pages 328–338, October 1992, and others, used such linear vector-space representations in order to perform estimation of original colors from scanner signals. However, these methods lead to simplified and typically inaccurate linear transformations between scanner signals and colorimetric values. Lee in "Colorimetric Calibration of a Video Digitizing System: Algorithm and Applications," *Color Research and Application*, volume 13, number 13, pages 180–186, 1988, used a similar method based on linear vector-space representation combined with ad-hoc modifications to reduce empirical deviations. This method suffers from limitations similar to other LUT methods as mentioned above. Funt, Ho and Drew in U.S. Pat. No. 4,992,963 entitled "Method and Apparatus for Determining Ambient Light and Surface Reflectance" disclose dividing light reflected by a surface, typically in a natural scene viewed in daylight or other light, into constituent parts of illuminating light and surface spectral reflectance. Linear models are used to approximate the spectral power distributions of the light and of the reflectance. The Funt et. al. invention is not concerned with nor applicable to scanner calibration.

Other Methods

Gerber in U.S. Pat. No. 5,003,500 entitled "Process and Apparatus for the Preparation of Color Formulations Utilizing Polarized Light in Spectrophotometry" discloses a process and apparatus for reproduction of a color original independently of its surface conditions. The process uses polarized light to eliminate the surface gloss factor from the color measurement process and to determine a colorant mixture needed to achieve a color match. David in U.S. Pat. No. 4,977,522 entitled "Apparatus for Determining the Formulation of Paint for Use in Bodywork Repair" discloses an apparatus for formulating a color match to an original using combination of base colors. The apparatus uses a receiver for picking up the light reflected from the original in preset wavelengths.

IMPROVING UPON METHODS KNOWN IN THE ART

The method and apparatus of the present invention enables accurate conversion of color scanner signals into exact colorimetric values without requiting any modification of the scanner lamp, filters or detectors. Further, the method and apparatus of the present invention does not require assuming a mixing model of how the individual colorants form color on the original. Further, it does not require knowledge of the spectra of the colorants used to form the original. This is done without knowledge of the spectral sensitivities of the scanner and only a few easily determined properties of any medium of interest that effectively represent the spectral characteristics of that medium, such as its spectra expressed in density (logarithmic) units. Such spectra are referred to interchangeably as logarithmic spectra and density spectra. These properties are herein called basis spectral functions, and can be determined, for example, from measured spectra of color samples using simple statistical techniques. Such an efficient representation of the logarithmic medium spectra enables accurate reconstruction of the spectrum at any pixel in a scanned original. This is done without assuming a mixing model for individual colorants in the original medium and without requiting knowledge of the spectra of the individual colorants in the medium. Moreover, unlike many of the approaches known in the art, the invention is applicable to convert scanned values for any medium. There is no restriction to a particular medium type.

Still further, the method and apparatus of the present invention determines the color transformation analytically based on modeling of the scanning device response along with modeling the scanned medium spectra using statistical characteristics. This is in contrast to prior art methods that use ad-hoc empirical techniques such as ad-hoc interpolation or function fitting. Moreover, the method and apparatus of the present invention allows one to determine exact colorimetric values for any observer model, for example, 2-degree or 10-degree standard colorimetric observers, as well as for any illuminant, for example, D5000 daylight or A standard illuminants.

More particularly, the method and apparatus of the present invention reconstructs the actual spectrum of each color image pixel, hence allowing for calculation of CIE colorimetric values for any desired illuminant and observer models using standard methods of colorimetry.

The method and apparatus of the present invention can be used for a broad variety of scanners such as drum and flatbed scanners, and for various medium types such as slides, reflections and transparencies.

SUMMARY OF THE INVENTION

The method disclosed in accordance with the present invention involves scanning a color original by a photosensitive device such as a scanner or densitometer with known spectral response characteristics (also often called spectral sensitivities). Output signals from the photo-sensitive device are used to reconstruct the spectrum of the original medium at any point, corresponding to the signals obtained at that point. Further, the spectrum may be converted into exact colorimetric values in any specific color space.

A scanned color medium typically is composed of a combination of colorants, such as a mixture of inks on a substrate to form a reflection print, or dyes in emulsions layered in a substrate to form a slide or transparency. The absorption spectra of the individual colorants and the absorption spectra of the substrate interact in an essentially multiplicative fashion to form the absorption spectra of the medium.

Following this observation, and in accordance with one embodiment of the present invention, a medium model is created to efficiently represent any spectrum which is realizable (that is, might appear) on a medium. The medium model is based on an easily determined small set of spectral functions and according to one embodiment is expressed in vector-space with the medium spectra thus represented being logarithmic spectra. This easily determined small set of spectral functions thus form basis vectors for spectra that are realizable on a medium.

Further, in accordance with another embodiment of the present invention, a method of reconstructing from scanner signals the spectrum of a color original on a medium is disclosed, where a first set of spectral functions, representing spectral sensitivities of the scanner and being used to provide a scanner model, and a second set of spectral functions are known, representing basis vectors for a medium model for typical spectra that might appear on a scanned original, with parameters as coordinates in the vector-space spanned by the basis spectral functions. The preferred method and apparatus of the present invention uses logarithmic spectra and includes the steps of determining an initial set of values for the parameters representing the coordinates in the vector-space spanned by the basis spectral functions and processing the parameter values in an iterative convergence loop until a solution is met according to a set criterion. The reconstructed medium spectrum is taken as the spectrum corresponding to the values obtained at the last iteration of the iterative loop.

The method and apparatus of the present invention may include the steps of converting the reconstructed medium spectrum into colorimetric values by performing an integration of the reconstructed spectrum weighted by a selected illuminant spectral content and selected observer color matching functions.

In one embodiment, the method comprises for a specific medium and a specific scanner, constructing a medium model for the medium, where the medium model is a representation of the medium and provides a spectral representation of the selected medium as a function of wavelength and is expressed in a coordinate system based on said medium, constructing a scanner model for the selected scanner, iteratively using the medium model and the scanner model to solve for a spectral function representative of a color input, and converting the spectral function into a colorimetric value representative of the color input. The method may be performed in a digital processing system including a processor such as a digital signal processor (DSP) or a CPU with memory, and a scanner for receiving the medium and scanning the media to provide the color input.

In accordance with this embodiment, a lookup table (LUT), possibly together with an interpolator, may be used to allow for efficient transformation of scanner signals into colorimetric values by loading entries of the LUT, addressed by scanner signals, with the colorimetric values developed by the method and apparatus of the present invention. Alternatively, the LUT may be loaded with values of the reconstructed spectra or with coordinates' values corresponding to the reconstructed spectra.

DETAILED DESCRIPTION OF THE PRESENT INVENTION

Some portions of the detailed descriptions which follow are presented in terms of equations and symbolic representations of operations on signal data typically processed by digital hardware. These equations and representations are the means used by those skilled in the data processing arts to most effectively convey the substance of their work to others skilled in the art.

While some of these equations and representations can be stated as an algorithm, which here and generally is conceived to be a self-consistent sequence of steps leading to a desired result, the steps are those requiring physical manipulations of physical quantities. The method and apparatus of the present invention converts signals which are output from a scanner. Thus usually, though not necessarily, the quantities manipulated take the form of electrical or magnetic signals capable of being stored, transferred, combined, compared and otherwise manipulated. It has proven convenient at times, principally for reasons of common usage, to refer to these signals as bits, values, variables, vectors, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as multiplying, adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers, digital signal processor or other similar devices as well as dedicated digital hardware. In all cases the distinction between the method operations in operating a computer or dedicated digital hardware and the method of computation itself should be borne in mind. The present invention relates to apparatus and to method steps for operating a computer or other digital hardware in processing electrical or other (e.g. mechanical, chemical) physical signals to generate other desired physical signals. In the present invention, starting signals represent output from a scanner, and the method and apparatus of the present invention convert such signals to other signals.

Figure 1A:
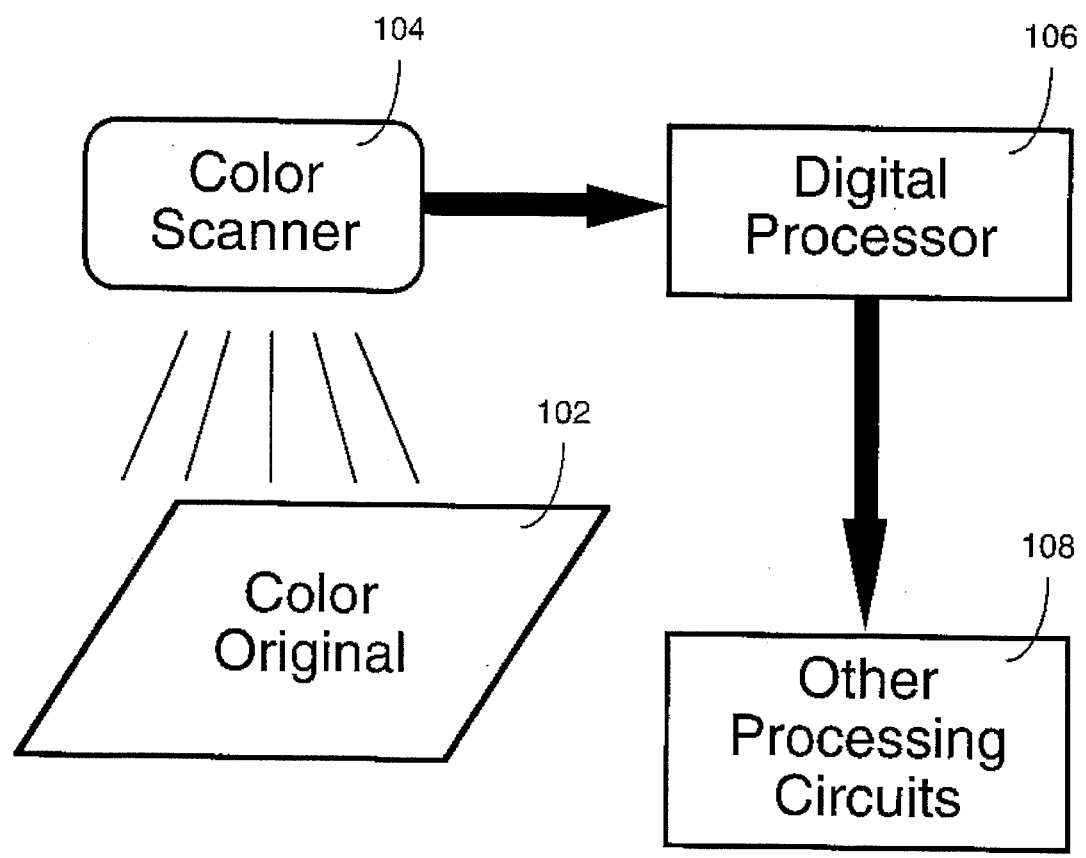
FIG. 1A is a general schematic diagram of a system implementing the method and apparatus of the present invention.

FIG. 1A schematically shows the preferred embodiment of the present invention. Referring to FIG. 1A, a color scanning device 104, which may consist of a light source, separation filters and a photo-sensitive element, scans a color original 102 to provide a set of signals, typically red, green and blue, representing color components for each pixel of the scanned medium. The color original 102 typically consists of a mixture of colorants on a substrate, such as reflection print, or layered dyes carried in a substrate, such as photographic paper or transparency. The set of scanner signals is supplied to a digital processor 106 that transforms the scanner signals into colorimetric signals representing colorimetric values in a particular colorimetric color space. The digital processor 106 may consists of a digital computer or of a digital signal processor (DSP) or of special-purpose hardware circuitry for carrying out the transformation. The colorimetric signals developed by the digital processor 106 may be supplied to other processing circuits 108 or directly to an output reproduction device, such as a display or a printer (not shown).

Figure 1B:
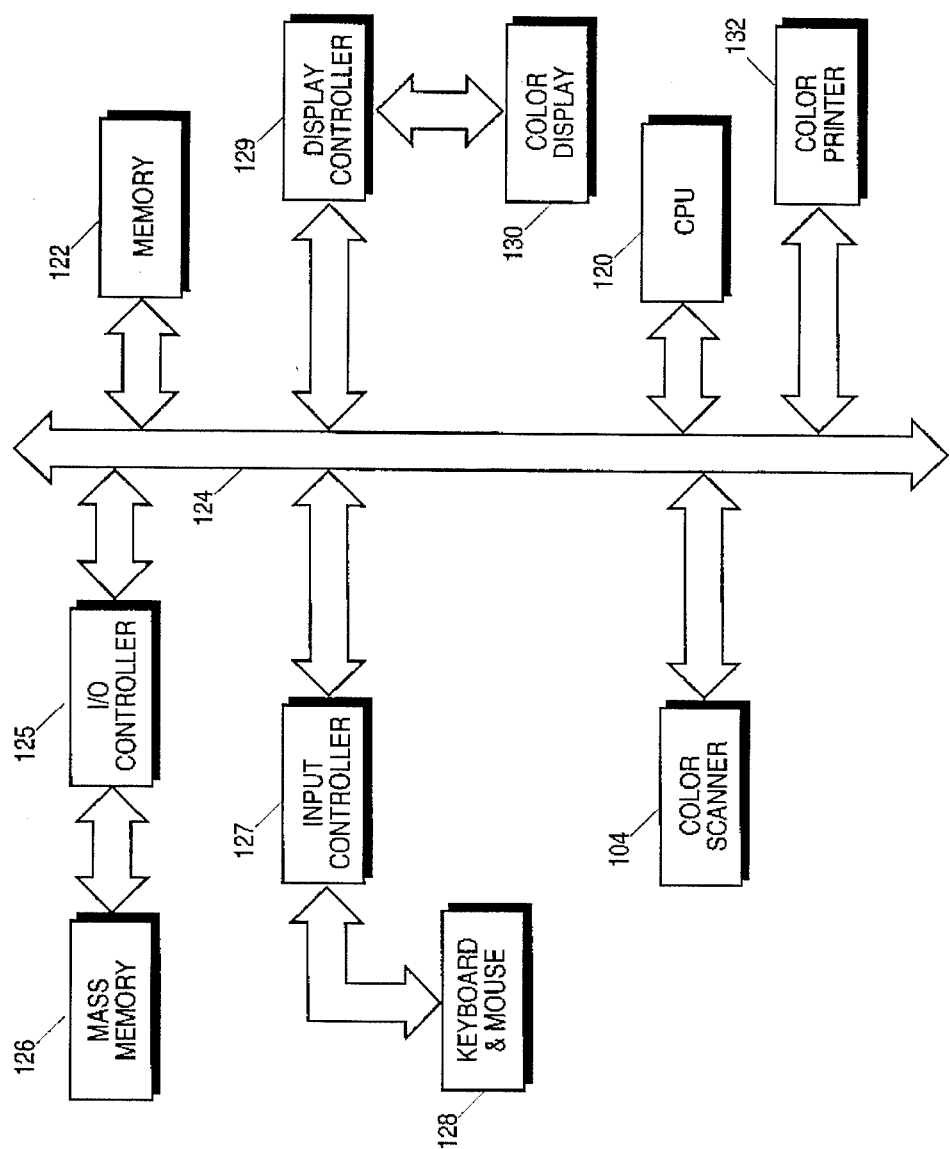
FIG 1B is a general schematic diagram of scanner and color printer connected to a digital computer system which implements the method of the present invention.

FIG. 1B shows a typical digital computer implementation of the system shown generally in FIG. 1A. The digital computer of FIG. 1B includes a conventional CPU 120, which typically comprises a microprocessor, conventional memory 122 and a conventional mass memory 126, which is often a hard disk or optical storage device. The CPU 120, memory 122 and mass memory 126 are interconnected by the system bus 124; the mass memory 126 is connected to be system bus 124 by a conventional I/O controller which is adapted to control, in a well known manner, the transfer of data to and from the mass memory 126. Although conventional peripherals, such as input devices (e.g. keyboard and/or mouse 128 or other cursor positioning devices) and a color display 130 (e.g. color CRT or color LCD), are also included in the computer system of FIG. 1B, other configurations are possible that do not require these peripherals, as will be clear to those in the art. These peripherals are controlled by their respective conventional controllers, the input controller 127 and the display controller 129, which couple the peripherals to the CPU 120 and the memory 122 via the system bus 124. Also shown included in FIG. 1B with the computer are the color scanner 104 and a conventional color printer 132. They are coupled to the CPU 120 and memory 122 by the bus 124; a separate conventional controller may act as an interface between the scanner 104 and the system bus 124 and, similarly, a conventional printer controller may act as an interface between the color printer 132 and the system bus 124. It will be appreciated that the scanner and printer are not necessary for the method of this invention to be carried out on a computer or for the apparatus of this invention to incorporate a computer. It also will be appreciated that numerous other well known computer architectures may be utilized by the present invention; for example, the CPU 120 may be implemented as a multiprocessor system or DSP, or system bus 124 may be coupled to certain peripherals over a conventional computer network—for example, the mass memory 126, color printer 132 and color scanner may be coupled to the CPU 120 and the system bus 124 via the computer network. Whatever the computer's architecture, the use of the system will typically involve, if a scanner is included, the user instructing the color scanner 104 to scan a color original 102, resulting in three scanner signal values being generated, for each pixel in the color original 102 (typically with the user specifying to the system an identification of the specific medium of the color original 102); for each pixel, these scanner signal values (R, G, B) will typically be stored in either mass memory 126 or memory 122 and then these scanner signals, for each pixel, will be processed, according to the processes of the present invention, by the CPU 120 to transform these scanner signals into colorimetric signals representing colorimetric values for each pixel. If a scanner is not included, the user will instruct the computer to input signal values which have previously been obtained from a scanner for each pixel of some color original. In either case, these scanner signals will be processed, according to the processes of the present invention, by the CPU 120 to transform these scanner signals into colorimetric signals representing colorimetric values for each pixel. These colorimetric signals may then be stored in memory 122 or mass memory 126 or may be further processed in conventional ways or may be converted to colorants or used to generate display signals to display the image of the color original on the color display 130. Further, if a printer is connected, the colorimetric signals, either with or without further processing, may be converted to colorants and provided to the color printer 132 to produce a reproduction of the color original 102.

In another embodiment of the present invention, signals from a scanner are converted into colorimetric values on the fly in a signal converter for converting scanner signals according to this invention. Such a signal converter may be contained in the scanner housing to provide a calibrated scanner which outputs calorimetric values directly.

Vector-Space Representation

A vector is a compact mathematical representation of an ordered set of values. When the ordered set represents values of a function of a variable or variables at discrete values of the variable or variables, the vector can be used to represent a function. The processes of the apparatus and method of the present invention are expressed in vector-space notation. It will be dear to those in the art that these processes may be expressed, without loss of generality, in many other notations.

In accordance with the present invention, it was found that vector-space models of low dimension can effectively be used as a media models to represent logarithmic spectra of colors on a medium, where the medium consists of a combination of mixed colorants such as, but not restricted to inks or layered dyes. It was found that for most such medium types, including the vast majority of media used in color reproduction, three linearly independent spectral functions are sufficient to represent accurately the logarithmic spectra (herein called medium spectra) of colors that can be rendered on the particular medium. Considering the resulting media spectra as members of a vector space, the three spectral functions that define this space are said to span the space and, synonymously, to be basis vectors of the base. The minimum number of linearly independent vectors that span a space is called the order of the vector space. Use of a low-order vector space medium model enables one to "reverse" the scanning process—that is, to reconstruct the medium spectrum of each pixel of original 102 from the corresponding signals of scanner 104. Further, the reconstructed medium spectrum can be converted into colorimetric values using the spectral functions of a desired illuminant and observer model. In this manner, the invention produces colorimetric values from practically any scanner thereby, in effect, calibrating the output values from the scanner.

The Scanner Model

In order to be able to "reverse" the scanning process, first one needs to determine a scanner model. That is, how a scanner produces its output signals. This is described in terms of the scanner's spectral response characteristics—that is, the function applied by scanner 104 to any input color spectrum to develop the scanner output signals. Scanning devices commonly found in the scientific and commercial fields of color reproduction may modeled by linearization curves and spectral sensitivities. The linearization curves or functions represent the non-linear functions which map each of the original red, green and blue channel signals, respectively, of scanner 104 to modified red, green and blue signals, respectively, that are proportional to the luminance of red, green and blue, respectively, in the original scanned image point. The red, green, and blue channel signals are formed by a superposition of the energy in the original at each wavelength weighed by the spectral response characteristic of the combined optical elements of scanner 104 at that wavelength, the superposition being over all wavelengths. The weightings for each of the red, green and blue channels as functions of wavelength are the spectral sensitivities or spectral response curves or functions for each of the red, green and blue channels. According to the above description, the following set of equations, here called the scanner equations, summarize the behavior of a scanner:

$$\int_\lambda S(\lambda)R(\lambda)d\lambda = f_R(r) \quad \text{(Equation 1a)}$$

$$\int_\lambda S(\lambda)G(\lambda)d\lambda = f_G(g) \quad \text{(Equation 1b)}$$

$$\int_\lambda S(\lambda)B(\lambda)d\lambda = f_B(b) \quad \text{(Equation 1c)}$$

where r, g and b are the red, green and blue signals, respectively, of scanner 104; $f_R$, $f_G$ and $f_B$ are the red, green and blue linearization functions, respectively, of the red, green and blue signals of scanner 104 so that $f_R(r)$, $f_G(g)$ and $f_B(b)$ are the modified (linearized) red, green and blue scanner signals; $R(\lambda)$, $G(\lambda)$ and $B(\lambda)$ are the red, green and blue spectral response functions (sometimes referred to as scanner sensitivities functions), respectively, of scanner 104; and $S(\lambda)$ is the medium spectrum, that is, the spectrum of the pixel being scanned. Equations 1a, 1b and 1c together represent a scanner model for any scanner such that, given the spectrum $S(\lambda)$ of a pixel of the original and given the spectral response functions and linearization functions of a particular scanner, Equations 1a, 1b and 1c provide a model of the scanner signals r, g and b.

While the scanner model of Equations 1a, 1b and 1c is for a traditional scanner producing scanner signals r, g and b, the present invention applies equally to scanning with a densitometer. Densitometers produce outputs in density units of cyan, magenta and yellow at any pixel of an original. Densitometers sometimes also produce a black density output. In the case of a densitometer producing cyan, magenta and yellow density signals, denoting by $D_C$, $D_M$ and $D_Y$, respectively, the cyan, magenta and yellow density signals of scanner 104, by $C(\lambda)$, $M(\lambda)$ and $Y(\lambda)$, respectively, the cyan, magenta and yellow spectral response (sensitivity) functions of the scanner, and by $W(\lambda)$ the spectrum of the reference white used by the densitometer, the densitometer equivalents of Equations 1a, 1b and 1c are:

$$\log \int_\lambda W(\lambda)C(\lambda)d\lambda - \log \int_\lambda S(\lambda)C(\lambda)d\lambda = D_C \quad \text{(Equation 2a)}$$

-continued $$\log \int_\lambda W(\lambda)M(\lambda)d\lambda - \log \int_\lambda S(\lambda)M(\lambda)d\lambda = D_M \quad \text{(Equation 2b)}$$

$$\log \int_\lambda W(\lambda)Y(\lambda)d\lambda - \log \int_\lambda S(\lambda)Y(\lambda)d\lambda = D_Y \quad \text{(Equation 2c)}$$

where again $S(\lambda)$ is the medium spectrum; that is, the spectrum of the pixel of the original, and "log" represents the logarithm to base 10. This invention can be practiced equally for scanners that are densitometers as for scanners that output in RGB, and differences in the method and apparatus will be clear and obvious to one in the art given the form above of the scanner model for densitometers. The detailed description of the embodiment of the method and apparatus of the invention is thus provided only for RGB scanners without loss of generality.

Figure 2:
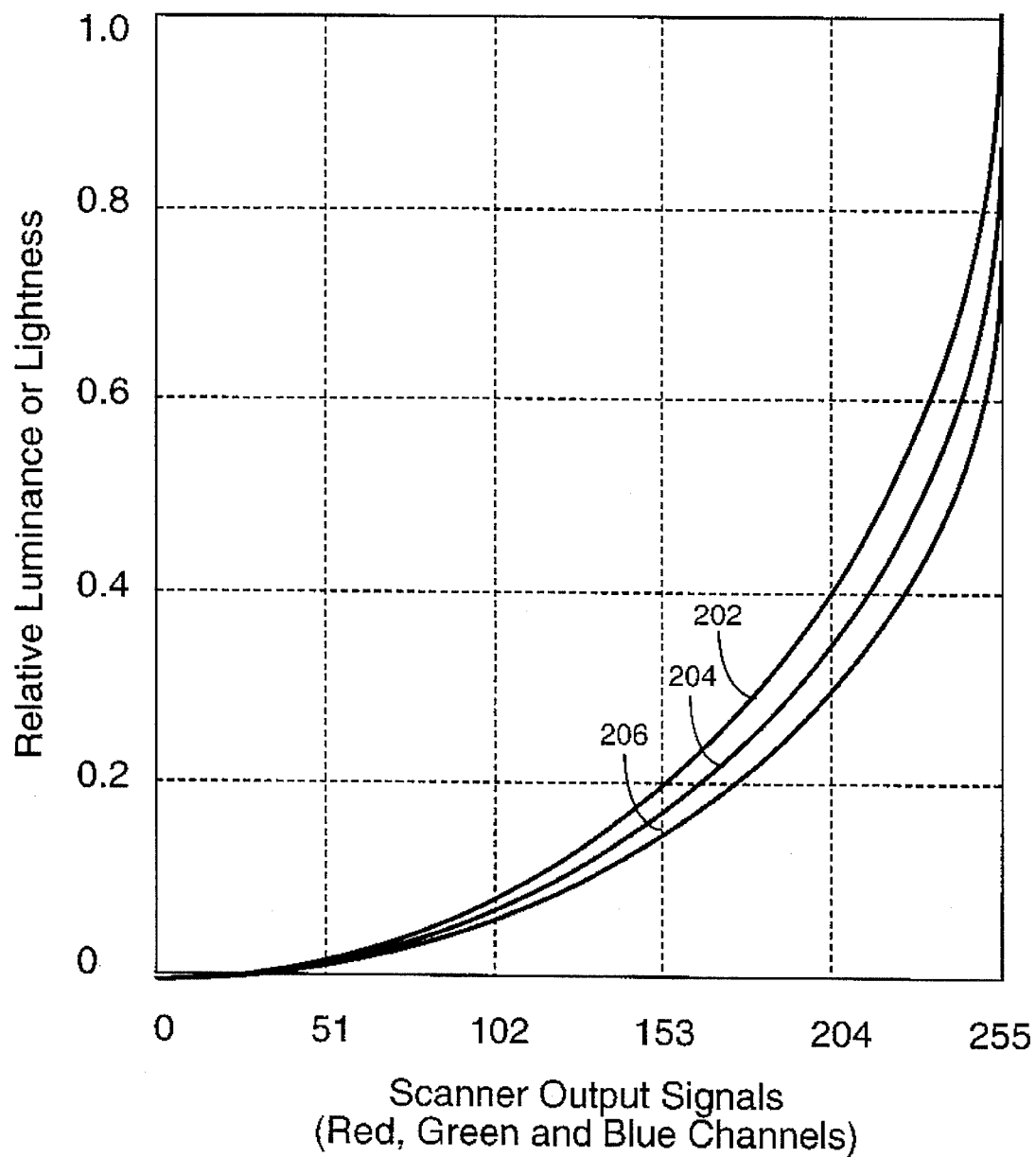
FIG. 2 is a set of typical curves representing the linearization functions of the red, green and blue channel outputs of the scanner depicted in FIG. 1 with respect to luminance.
Figure 3:
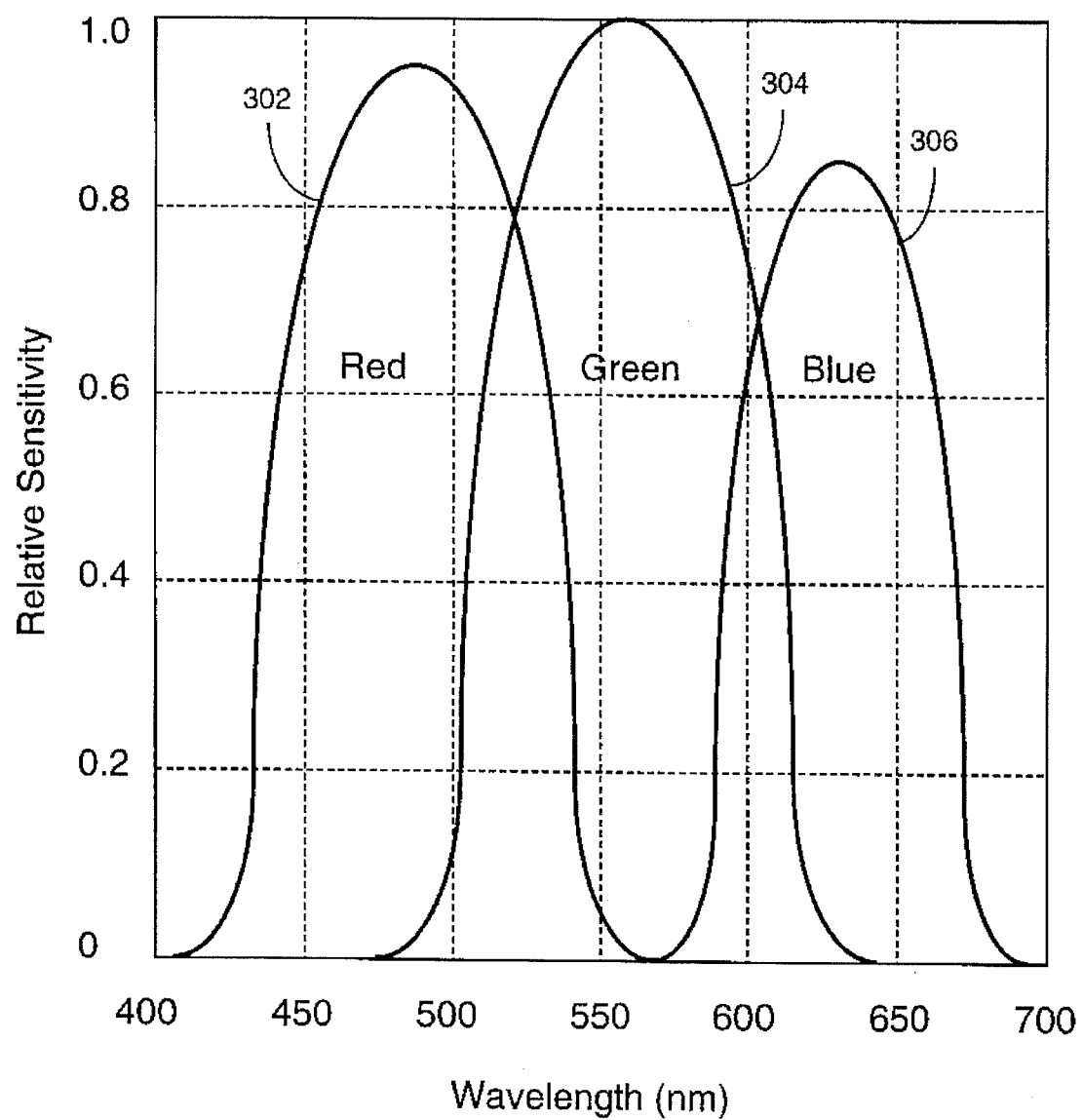
FIG. 3 is a set of typical curves representing the spectral response characteristics, also known as spectral sensitivities, of the red, green and blue channels of the scanner depicted in FIG. 1.

In the present invention, the linearization functions and spectral response functions of scanner 104 are determined by traditional techniques which are well known in the art. Alternatively, these functions may be determined from data supplied by the scanner manufacturer of the particular scanner. The method used to determine the linearization functions is essentially that described by Kang in "Color Scanner Calibration," *Journal of Imaging Science and Technology*, volume 36, number 2, pages 162–170, March–April 1992. A set of curves 202, 204 and 206, illustrating linearization functions for the red, green and blue channels respectively is shown in FIG. 2. The method used to determine the scanner spectral response functions is essentially that described by Pratt and Mancill in "Spectral Estimation Techniques for the Spectral Calibration of a Color Image Scanner," *Applied Optics*, volume 15, number 1, pages 73–75, January 1976, also described in Mancill's Ph.D. dissertation, noted above. A typical set of curves, 302, 304 and 306, illustrating the spectral response functions (or spectral sensitivities) of the red, green and blue channels respectively is shown in FIG. 3. It will be appreciated that the linearization functions and spectral response functions provide a basis for constructing a scanner model for the scanner 104.

The Medium Model

Figure 4:
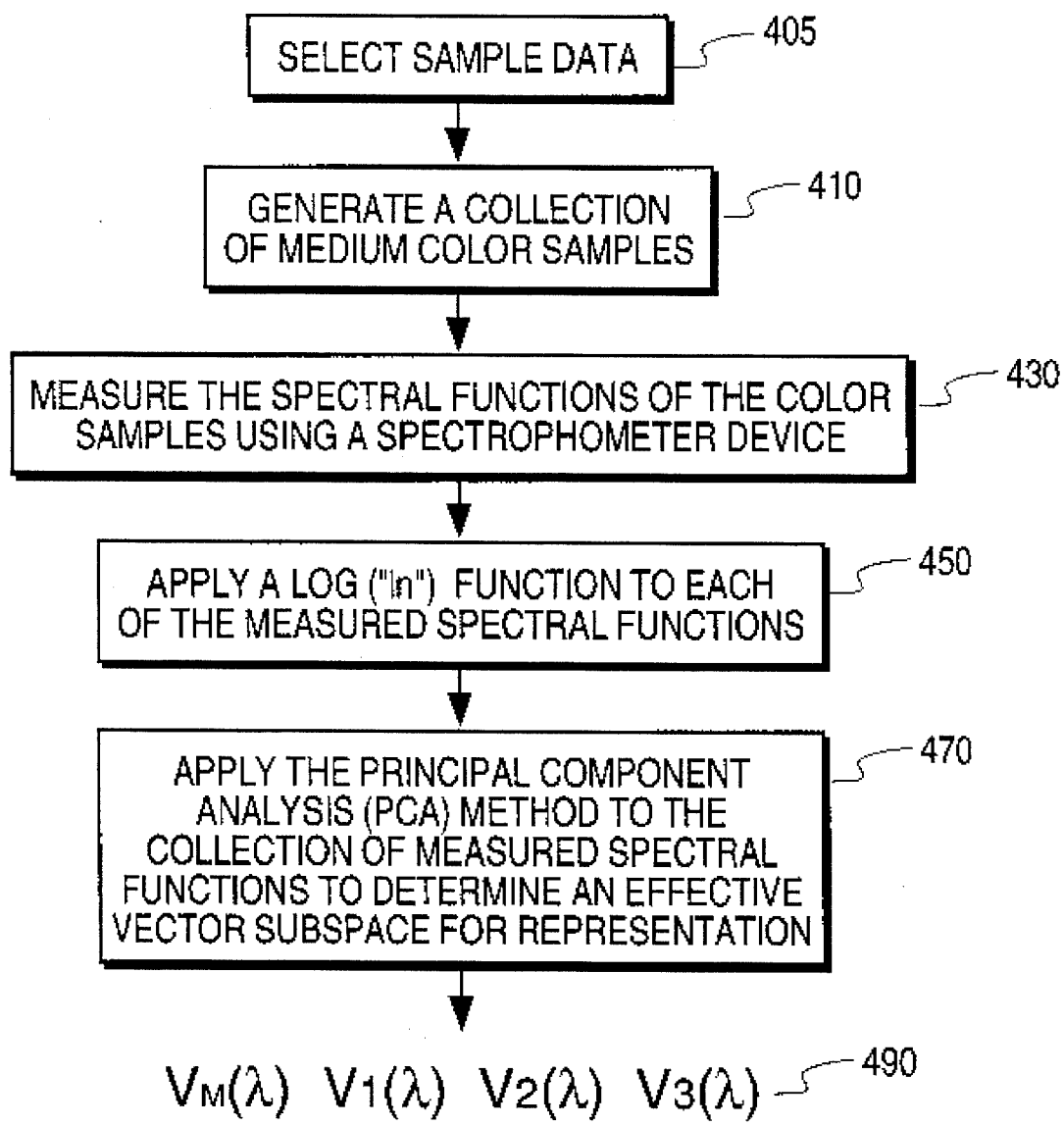
FIG. 4 is a flow chart describing the generation of the spectral functions for representing the logarithmic spectra of a specific medium type.

FIG. 4 shows a flow chart that outlines a method, according to the present invention, for determining an appropriate set of basis spectral functions for any medium to produce a medium model for that medium and media of the same type as that medium. These spectral functions effectively represent the color spectra that can be rendered on a specific medium (for example, photographic papers of a certain kind) from which a color original 102 is made. First, as shown in FIG. 4 at step 405, a sample medium of the desired medium type is selected to be representative of the medium type. A collection of color samples of a selected medium 102 is generated at step 410. Typically, this collection is a set of color patches. Such collections of color patches are commercially available and readily accessible to one engaged in the field. An example is the Q60 color reproduction guide made by the Eastman Kodak Company of Rochester, N.Y. Alternatively, collections of color patches may be produced on the sample medium of the medium type of interest by various reproduction processes, such as, for example, by feeding combinations of cyan, magenta and yellow signals to a color printer for printing a color patch on a paper of a paper type (the medium type). Next, in step 430, the spectral content of the collection of patches is obtained. These form a set of measured spectra. For example, in the case of a reflective medium type, spectral reflectance functions may be measured using a reflective spectrophotometer device to form the measured spectra. Such measuring is typically accomplished by placing a color patch into a spectrophotometer device and obtaining intensity readings (e.g. reflectance intensity) at numerous wavelengths ($\lambda$) from the spectrophotometer. For example, in one embodiment, 31 intensity readings by the spectrophotometer at 31 wavelengths for a color patch on a sample medium provides a sampling of the spectral reflectance function for this color patch on this medium representing the medium type. This is repeated for several color patches on the same sample medium of the medium type (e.g. type of paper) at the same 31 wavelengths, and after several color patches are so measured, the step 430 produces a set of measured spectra each having 31 spectral values. Each measured spectrum may be regarded as a vector (e.g., the set vector $$_1C = [_1C_1 \; _1C_2 \ldots _1C_{31}]$$

comprises one measured spectrum from one color patch while the set $$_2C = [_2C_1 \; _2C_2 \ldots _2C_{31}]$$

comprises another measured spectrum from another patch on the same medium of the same medium type. Next, in step 450, a logarithm (e.g. the natural logarithm "ln" in a preferred embodiment) function is applied to the measured spectra. That is, elements of each spectral function are replaced by their logarithm; thus, for example, for the first color patch the measured spectrum is replaced by the vector $[\ln(_1C_1) \; \ln(_1C_2) \ldots \ln(_1C_{31})]$. Functions other than the logarithm might be used in alternate embodiments. In the final step 470, a vector subspace is determined from the resulting logarithmic measures spectra. The subspace is specified by three linearly independent spectral functions that span the vector subspace, so has order 3. In other words, it is a three-dimensional (3-D) subspace. These are the basis spectral functions that span (define) the subspace. In the preferred embodiment, the determined subspace also includes another spectral function serving as an offset vector spectral function. Again it will be clear to those in the art that while vector-space notation is used here to describe conveniently this invention, other possibly less convenient notations are possible to describe this invention.

In the preferred embodiment, the well-known method of principal component analysis (PCA) is used to determine the basis spectral functions defining the subspace. PCA determines the offset spectral function to be the mean of logarithmic measured spectra. The three basis spectral functions are obtained by applying the well-known method of singular value decomposition (SVD) to the logarithmic measured spectra, after the offset spectral function has been subtracted from each of the logarithmic measured spectra. The first three singular vectors resulting from the SVD are selected to represent the vector subspace.

Determining four spectral functions in this way by the method outlined in the flow chart of FIG. 4 leads to the following representation for any color spectrum that might occur on the medium 102 of the medium type. Denoting this spectrum by S(λ), $$S(\lambda)=exp[V_M(\lambda)+a_1V_1(\lambda)+a_2V_2(\lambda)+a_3V_3(\lambda)] \quad \text{(Equation 3)}$$

where $V_M(\lambda)$ is the offset spectral function, $V_1(\lambda)$, $V_2(\lambda)$ and $V_3(\lambda)$ are the basis spectral functions, exp[x] denotes $e^x$, and $a_1$, $a_2$ and $a_3$ are scalars serving as coordinates in the vector subspace defining such spectra. Other methods for fitting linear models to a collection of vectors are known in the art, and may be used in the method and apparatus of this invention instead of PCA to determine the basis spectral functions for the representation of any spectrum of the medium 102. Equation 3 represents the medium model for any medium of the medium type for which the sample medium used in the measuring step 430 is representative. In one embodiment where 31 samplings are obtained in the measuring step 430 from each color patch on the sample medium of the medium type, the basis spectral functions $V_1(\lambda)$, $V_2(\lambda)$ and $V_3(\lambda)$ are vectors each having 31 values each at a particular sampling value of λ. That is, there are 31 discrete values of λ. The same is true for the offset spectral function $V_M$. Thus, it will be appreciated that Equation 3 is a medium model with three "unknown" parameters $a_1$, $a_2$, and $a_3$. Any values of these parameters corresponding particular scanner signals define the spectrum of the color original 102 according to the medium model. According to the method and apparatus of this invention, these unknown parameters are determined from the scanner output signals.

It should be noted that in an actual implementation, all spectral functions are discrete versions of the respective continuous spectrum signals. They thus may be represented by finite-length vectors. In the preferred embodiments as noted, vectors of 31 elements are used as discrete versions of the respective spectral functions. These vectors are derived by sampling the spectral functions in the frequency range of λ=400 nanometer to 700 nanometer at 10 nanometer intervals.

Similarly, mathematical operations among spectral functions are performed by their discrete counterparts from matrix algebra. For example, integration of spectral functions is performed by an inner product—that is, by multiplying the respective vectors' elements, element-by-element and summing the products.

Figure 5:
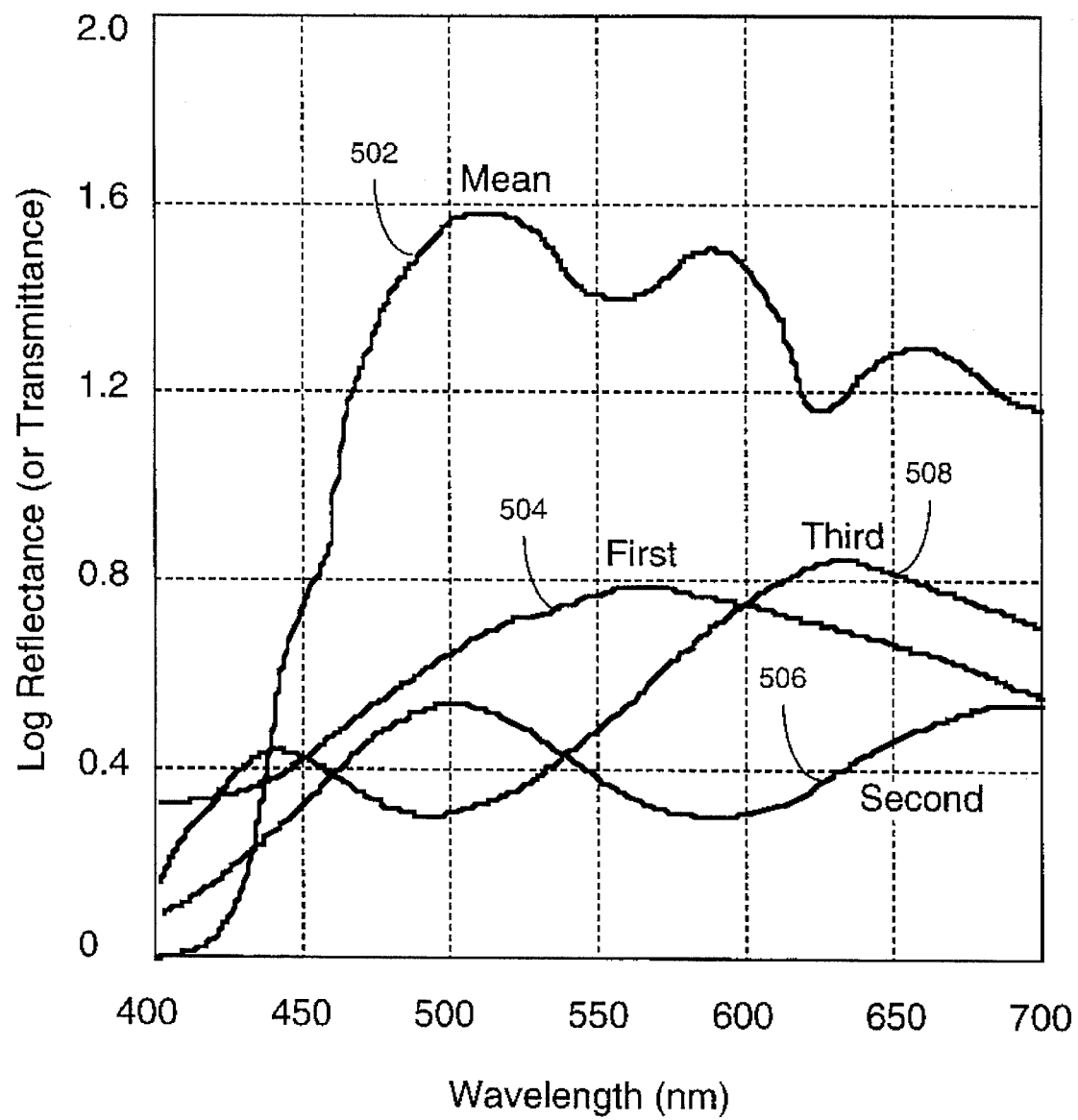
FIG. 5 is a set of curves representing typical spectral functions generated by the flow chart of FIG. 4.

A set of curves illustrating the four spectral functions (the mean spectral function $V_M(\lambda)$ and the three basis spectral functions) for the selected medium determined by the method outlined in the flow chart of FIG. 4 is shown in FIG. 5. In the particular example of FIG. 5, the four spectral functions have been drawn as continuous, rather than discrete, functions by smoothing the discrete points along each curve into a continuous curve. The curve 502 represents the mean spectral function $V_M(\lambda)$, and curves 504, 506 and 508 represent respectively the three basis functions $V_1(\lambda)$, $V_2(\lambda)$ and $V_3(\lambda)$.

In the method and apparatus of the invention, the medium model is determined either as part of converting scanner signals, or is predetermined before converting any actual scanner signals.

Determining the Medium Spectrum

Once the basis spectral functions of the medium model for the medium type of interest are determined, determining the medium spectrum from the scanner signals involves determining from the scanner signals r, g and b, the $a_1$, $a_2$ and $a_3$ parameters of the medium model of Equation 3. This is done using an iterative convergence loop to solve the scanner model, restated here for convenience, $$\int_\lambda S(\lambda)R(\lambda)d\lambda = f_R(r) \quad \text{(Equation 1a)}$$

$$\int_\lambda S(\lambda)G(\lambda)d\lambda = f_G(g) \quad \text{(Equation 1b)}$$

$$\int_\lambda S(\lambda)B(\lambda)d\lambda = f_B(b) \quad \text{(Equation 1c)}$$

where r, g and b are the scanner signals, and S(λ) is the unknown medium spectrum to be determined, represented by the medium model, rewritten here in logarithmic form $$\ln S(\lambda)=V_M(\lambda)+a_1V_1(\lambda)+a_2V_2(\lambda)+a_3V_3(\lambda). \quad \text{(Equation 3)}$$

For convenience, the linearized scanner signals $f_R(r)$, $f_G(g)$ and $f_B(b)$, respectively are denoted by r', g' and b', respectively.

The Iterative Loop

The iterative loop of the method and apparatus of the invention starts with initial estimates for the parameters $a_1$, $a_2$ and $a_3$, and uses the technique known in the art as the Newton-Raphson technique to produce modification signals $\Delta a_{k1}$, $\Delta a_{k2}$ and $\Delta a_{k3}$, respectively, by which to modify the parameters $a_1$, $a_2$ and $a_3$, at each iteration step, referred to here by the subscript k. Denoting $a_{k1}$, $a_{k2}$ and $a_{k3}$ respectively, as current (i.e., $k^{th}$) values of $a_1$, $a_2$ and $a_3$ prior to updating, the updating is described by $$a_{(k+1)1}=a_{k1}-\Delta a_{k1} \quad \text{(Equation 4a)}$$

$$a_{(k+1)2}=a_{k2}-\Delta a_{k2} \quad \text{(Equation 4b)}$$

$$a_{(k+1)3}=a_{k3}-\Delta a_{k3} \quad \text{(Equation 4c)}$$

where $a_{(k+1)1}$, $a_{(k+1)2}$ and $a_{(k+1)3}$ are the new values of $a_1$, $a_2$ and $a_3$, respectively, determined during this ($k^{th}$) iteration. The estimate of the medium spectrum produced at any iteration, denoted by $S_k(\lambda)$, is $$S_k(\lambda)=exp[V_M(\lambda)+a_{k1}V_1(\lambda)+a_{k2}V_2(\lambda)+a_{k3}V_3(\lambda)]. \quad \text{(Equation 5)}$$

The modification signals are produced according to the following formula:

$$\begin{bmatrix} \Delta a_1 \\ \Delta a_2 \\ \Delta a_3 \end{bmatrix} = N^{-1} \begin{bmatrix} r' - \int_\lambda S_k(\lambda)R(\lambda)d\lambda \\ g' - \int_\lambda S_k(\lambda)G(\lambda)d\lambda \\ b' - \int_\lambda S_k(\lambda)B(\lambda)d\lambda \end{bmatrix} \quad \text{(Equation 6)}$$

where r', g' and b' are the linearized scanner signals and the matrix N is computed by:

$$N = \begin{bmatrix} \int_\lambda S_k(\lambda)R(\lambda)V_1(\lambda)d\lambda & \int_\lambda S_k(\lambda)R(\lambda)V_1(\lambda)d\lambda & \int_\lambda S_k(\lambda)R(\lambda)V_1(\lambda)d\lambda \\ \int_\lambda S_k(\lambda)G(\lambda)V_1(\lambda)d\lambda & \int_\lambda S_k(\lambda)G(\lambda)V_1(\lambda)d\lambda & \int_\lambda S_k(\lambda)G(\lambda)V_1(\lambda)d\lambda \\ \int_\lambda S_k(\lambda)B(\lambda)V_1(\lambda)d\lambda & \int_\lambda S_k(\lambda)B(\lambda)V_1(\lambda)d\lambda & \int_\lambda S_k(\lambda)B(\lambda)V_1(\lambda)d\lambda \end{bmatrix}$$

(Equation 7)

After the modification signals $\Delta a_{k1}$, $\Delta a_{k2}$ and $\Delta a_{k3}$ are determined for the current iteration, a determination is made as to whether to stop at the current iteration. In the preferred embodiment of the method and apparatus of the present invention, the process stops when the modification signals $\Delta a_1$, $\Delta a_2$ and $\Delta a_3$ fall below a certain threshold. It has been found that six iterations of the iterative loop are usually sufficient to achieve accuracy such that the errors are smaller than color differences typically noticeable to humans.

$$\begin{bmatrix} b_1 \\ b_2 \\ b_3 \end{bmatrix} = M^{-1} \begin{bmatrix} r' - \int_\lambda W_M(\lambda)R(\lambda)d\lambda \\ g' - \int_\lambda W_M(\lambda)G(\lambda)d\lambda \\ b' - \int_\lambda W_M(\lambda)B(\lambda)d\lambda \end{bmatrix}$$

(Equation 9)

where the matrix M is computed by:

$$M = \begin{bmatrix} \int_\lambda W_1(\lambda)R(\lambda)d\lambda & \int_\lambda W_2(\lambda)R(\lambda)d\lambda & \int_\lambda W_3(\lambda)R(\lambda)d\lambda \\ \int_\lambda W_1(\lambda)G(\lambda)d\lambda & \int_\lambda W_2(\lambda)G(\lambda)d\lambda & \int_\lambda W_3(\lambda)G(\lambda)d\lambda \\ \int_\lambda W_1(\lambda)B(\lambda)d\lambda & \int_\lambda W_2(\lambda)B(\lambda)d\lambda & \int_\lambda W_3(\lambda)B(\lambda)d\lambda \end{bmatrix}$$

(Equation 10)

Determining Initial Parameter Estimates

Determining initial values in the iterative loop for the coordinate signals $a_1$, $a_2$ and $a_3$ is now described. First, an approximate linear representation for the medium spectrum $S(\lambda)$ is made. The approximation of $S(\lambda)$, denoted by $S^*(\lambda)$ is $$S^*(\lambda) = W_M(\lambda) + b_1 W_1(\lambda) + b_2 W_2(\lambda) + b_3 W_3(\lambda) \quad \text{(Equation 8)}$$

where $W_M(\lambda)$ is an offset spectral function, $W_1(\lambda)$, $W_2(\lambda)$ and $W_3(\lambda)$ are approximate basis spectral functions, and $b_1$, $b_2$ and $b_3$ are parameters to be determined. The form of Equation 8 is similar to the form of Equation 3. Hence the functions $W_M(\lambda)$, $W_1(\lambda)$, $W_2(\lambda)$ and $W_3(\lambda)$ are calculated using a procedure identical to the flow chart illustrated in FIG. 4, except that step 450 of applying a logarithm function is omitted. The next step involves substituting $S^*(\lambda)$ according to Equation 8 for $S(\lambda)$ in the scanner equations 1a, 1b and 1c. This results in a set of three linear equations in the three unknowns $b_1$, $b_2$ and $b_3$, given the scanner signals r, g and b. The unknowns are solved using any linear equation solving methods well-known in matrix algebra, and the approximate spectrum $S^*(\lambda)$ is then calculated using Equation 8. Specifically, in the preferred embodiment, the values of $b_1$, $b_2$ and $b_3$ are determined from the linearized scanner signals r', g' and b' as follows:

These values of $b_1$, $b_2$ and $b_3$ are used to produce the approximate spectrum $S^*(\lambda)$, and the initial values for the coordinates $a_1$, $a_2$ and $a_3$, denoted by $a_{10}$, $a_{20}$ and $a_{30}$, respectively are produced by carrying out the computations described by:

$$a_{10} = \int_\lambda [\ln(S^*(\lambda)) - V_M(\lambda)] V_1(\lambda) d\lambda \quad \text{(Equation 11a)}$$

$$a_{20} = \int_\lambda [\ln(S^*(\lambda)) - V_M(\lambda)] V_2(\lambda) d\lambda \quad \text{(Equation 11b)}$$

$$a_{30} = \int_\lambda [\ln(S^*(\lambda)) - V_M(\lambda)] V_3(\lambda) d\lambda \quad \text{(Equation 11c)}$$

Direct Method and Apparatus

Figure 8A:
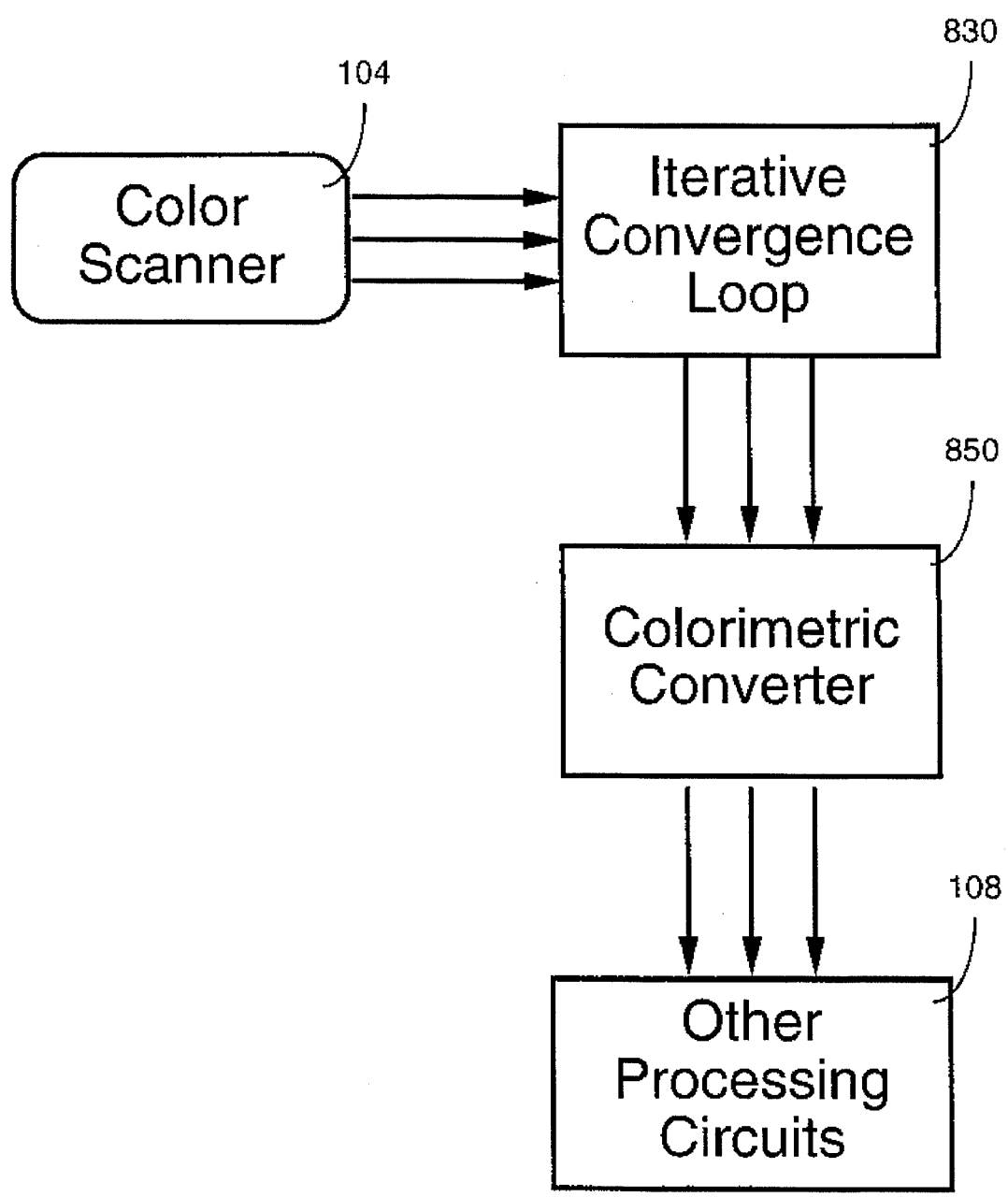
FIG. 8A is a schematic diagram of a system that does not use a LUT to convert scanner signals into colorimetric values.

One embodiment of converting scanner signals into calorimetric signals is illustrated in FIG. 8A. After the linearization functions (e.g. see FIG. 2) and spectral response functions (e.g. see FIG. 3) have been determined for scanner 104 and after the four representative spectral functions (e.g. see FIG. 5) have been determined for medium 102, iterative convergence loop 830 may be used to produce spectrum values for each set of scanner signals. These spectrum values are then converted into colorimetric signals by colorimetric converter 850. This is referred to herein as direct processing to distinguish it from use of lookup tables and other alternate but faster techniques described in alternate embodiments below. Such direct processing might be more accurate than alternate but faster embodiments.

In the preferred embodiment of direct processing, scanner signals range from 0 to 255 in increments of 17, that is 16 steps per channel, in each of the red, green and blue channels. These scanner signals are processed by the iterative convergence loop 830 according to the invention and the colorimetric converter 850 to obtain colorimetric signals, such as signals representing values in the CIEXYZ color space. The colorimetric signals may be supplied to other processing circuits 108 or directly to an output reproduction device, such as a display or a printer (not shown).

Figure 8B:
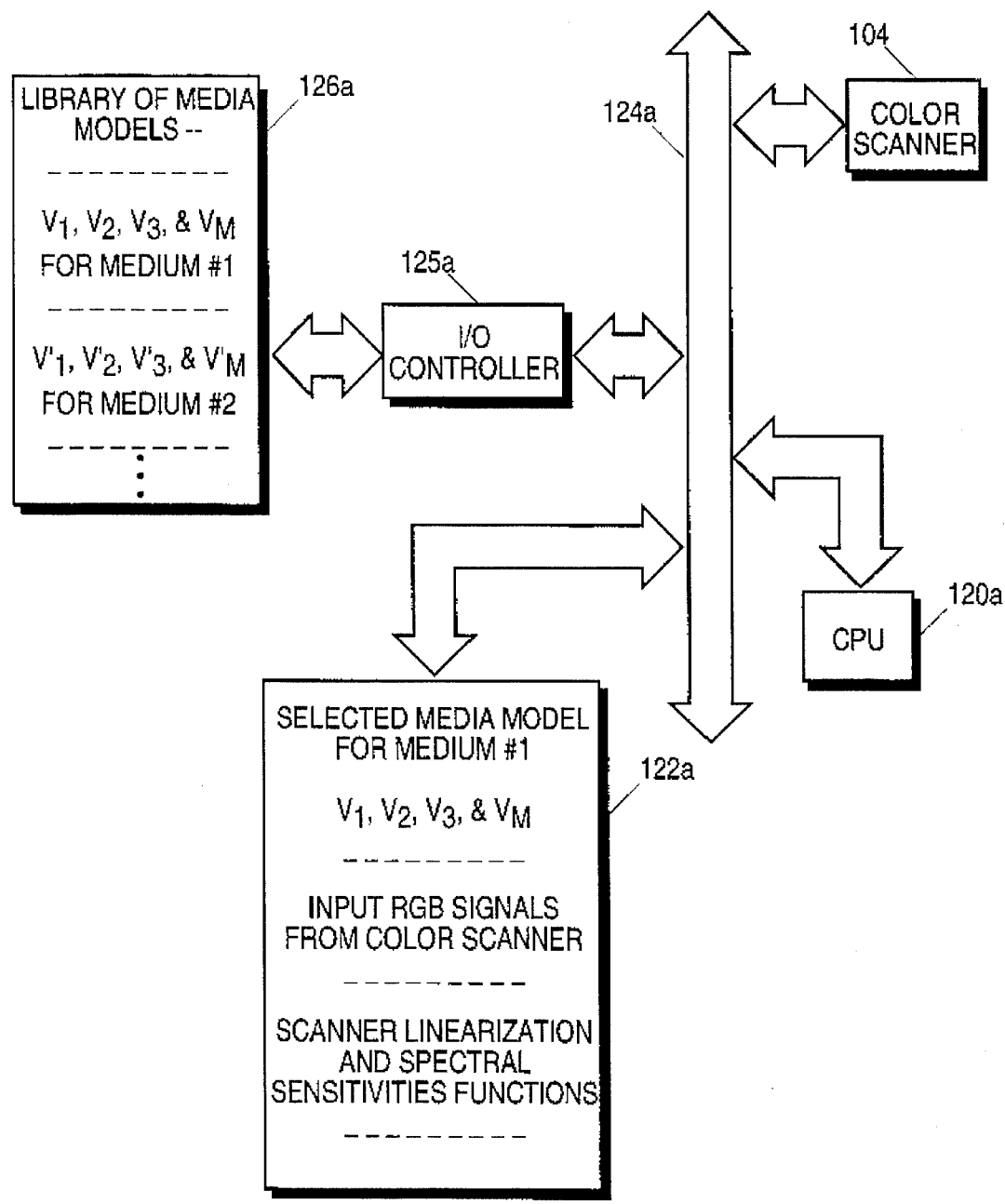
FIG. 8B is a schematic diagram of a digital computer system that does not use a LUT to convert scanner signals into colorimetric values.

FIG. 8B shows a particular digital computer embodiment of the apparatus of FIG. 8A, and this particular embodiment is analogous to the scanner/digital computer combination shown in FIG. 1B, but without the printer of FIG. 1B. The mass memory 126a, which may be a conventional hard disk, is coupled to the CPU 120a via the conventional I/O controller 125a and bus 124a. The memory 122a, which may be conventional system DRAM, is coupled to the CPU 120a for storage of operating system programs and for other programs and data. As shown in FIG. 8B, the CPU 120a will typically cause the color scanner 104 to scan the color original to thereby provide scanner signals which may be stored in memory 122a. The basis spectral functions for the selected medium (which was, or is to be, scanned) may be loaded from memory 126a into the memory 122a. Note that, as shown in FIG. 8B, the mass memory 126a may contain many different basis spectral functions for many different media such that the user may, by an input device, indicate to the computer the type of media which is being scanned so that the appropriate media model, represented by the appropriate basis spectral functions may be loaded from mass memory 126a into memory 122a. Alternatively, the appropriate basis spectral function may be loaded into the memory 122a by a signal or data embedded in the scanner data which indicates the scanner and medium type. It will be appreciated that the CPU 120a, typically in conjunction with data (such as the input RGB signals and the selected media model) and programs stored in the memory 122a and/or memory 126a, operates to provide the iterative convergence loop 830 and colorimetric converter 850.

Figure 9:
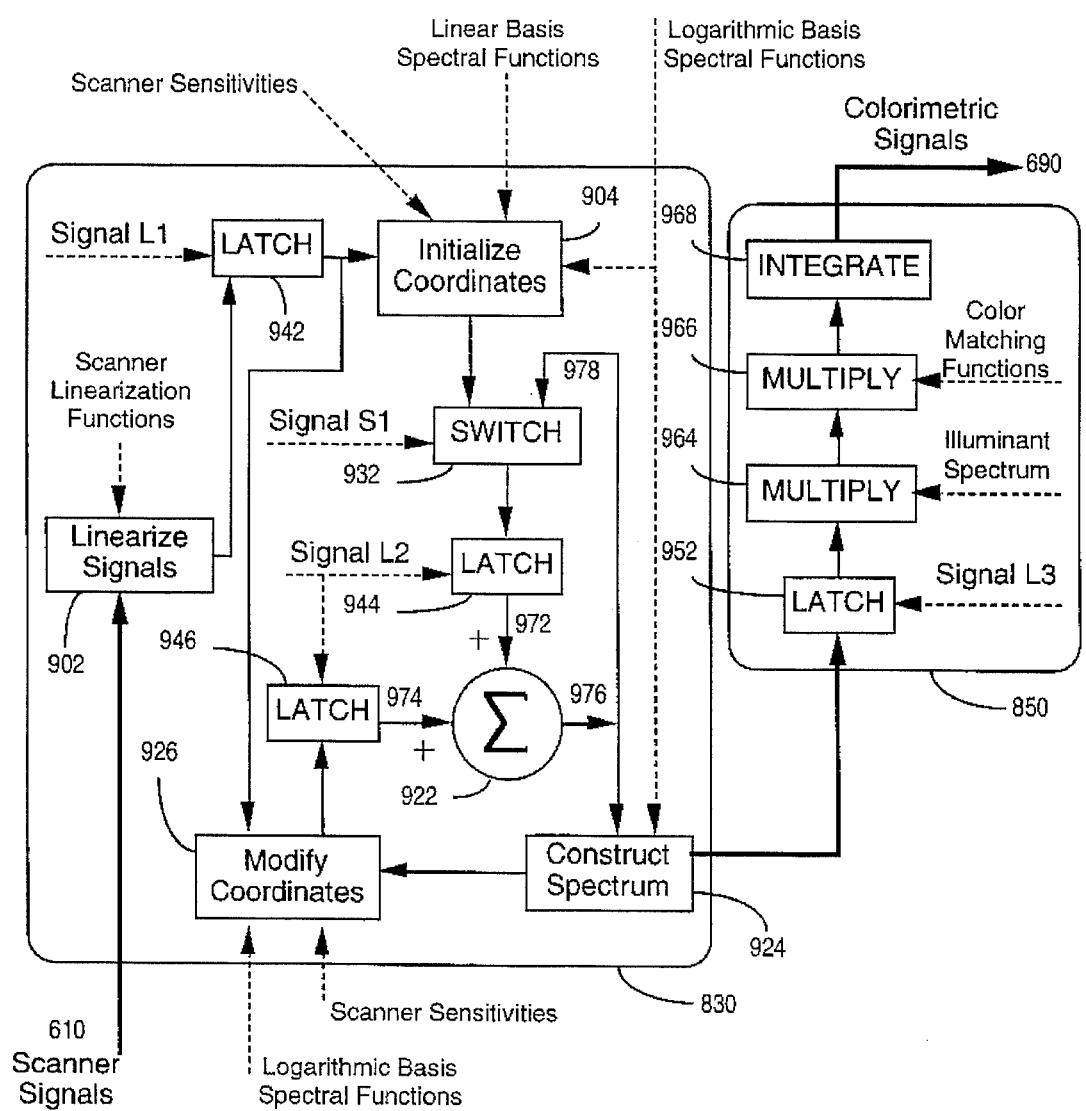
FIG. 9 is a schematic diagram of a system for implementing the operation performed by the digital processor of FIG. 1A.

Referring now to FIG. 9, the iterative convergence loop 830 and the colorimetric converter 850 are illustrated in finer detail. FIG. 9 shows schematically an apparatus for implementing these steps. Iterative convergence loop 830 incorporates a signal linearization module 902, a coordinates initialization module 904, an adder 922, a spectrum construction module 924 and a coordinates modification module 926. Also, switch 932 and latches 942, 944 and 946 control the flow of data throughout the loop according to signals S1, L1 and L2. Signal S1 causes switch 932 to select one or the other of its inputs as its output, signal L1 causes latch 942 to latch, and signal L2 causes both latch 944 and latch 946 to latch. These signals operate in accordance with whether the current iteration of loop 830 is the first or a subsequent iteration.

The colorimetric converter 850 incorporates multiplication modules 964 and 966, and an integration module 968. Also, latch 952 controls the entry point to the colorimetric converter 850 according to signal L3. This signal operates in accordance with whether loop 830 terminates and is typically provided by the modify coordinates module 926. Either the iterative convergence loop 830 or the colorimetric converter 850 or both may be implemented by a computer program, by an electronic hardware circuit, or by a combination of both.

The iterative convergence loop 830 implements a solution to the scanner equations, Equations 1a, 1b and 1c. Alternatively, and in an analogous manner, iterative convergence loop 830 could implement a solution to the densitometer equations, Equations 2a, 2b and 2c. The procedure carried out by the iterative convergence loop 830 for the case of scanner equations will now be described.

Figure 11:
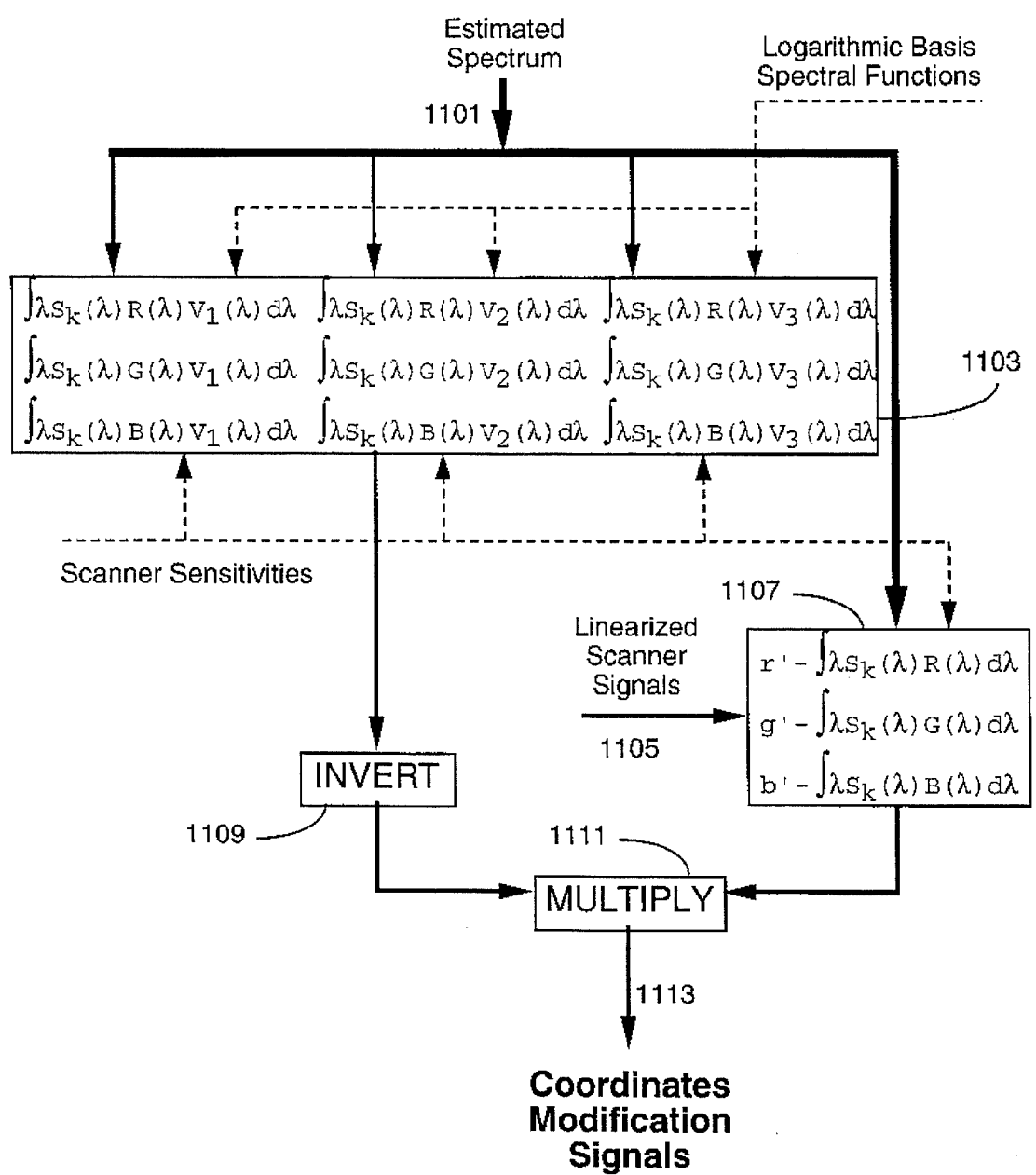
FIG. 11 is a schematic diagram of a system implementing the function performed by module 926 of FIG. 9 to determine the modification of coordinates.

A triplet of red, green and blue signals defining the color components from scanner 104 are linearized by module 902, and the result is latched by latch 942. Further, the triplet of linearized red, green and blue signal is passed to module 904 to obtain an initial approximation to the coordinates $a_1$, $a_2$ and $a_3$ represented by a triplet of signals. Next, these coordinate signals are fed to switch 932. During the first iteration of loop 830, the initial coordinates signals are transferred by switch 932 to be latched by latch 944 (this is determined by signal S1 which acts as a switch select, also known as a multiplexer select, which is set to select the initial coordinates from module 904 only on the first iteration. The coordinate signals are further fed to the non-inverting input 972 of adder 922. During this first iteration, the other non-inverting input 974 of adder 922 is of zero value. The coordinate signals developed by adder 922 are fed at the output 976 to both module 924 and back to switch 932 at input 978. Module 924 then develops a vector representing the pixel spectrum $S_k(\lambda)$ corresponding to the current input coordinate signals. The input represents the coordinates $a_1$, $a_2$ and $a_3$, and module 924 computes the vector representing the pixel spectrum $S_k(\lambda)$ using these coordinates $a_1$, $a_2$ and $a_3$ and Equation 3. The vector is further fed to module 926 which produces a triplet of modification signals that are latched by latch 946 at the end of an iteration. The operation of module 926 in the preferred embodiment is illustrated in FIG. 11.

During subsequent iterations of loop 830 for a particular pixel or LUT address, switch 932 transfers the modified coordinate signals (supplied on line 978) rather than the initial coordinates signals from module 904. These coordinate signals transferred by switch 932 are then latched by latch 944 and further fed to the non-inverting input 972 of adder 922. The triplet of modification signals which were latched by latch 946 in the previous iteration, are supplied to the other non-inverting input 974 of adder 922 which in turn produces a new triplet of modified coordinates signals.

The preceding process continues until a stopping criterion is met. In the preferred embodiment, the procedure terminates when the coordinate modification signals produced by module 926 fall below a certain threshold. This termination is indicated by signal L3 from module 926. Other stopping criteria known in the fields of numerical analysis and optimization may be used instead. It has been found that six iterations of loop 830 are usually sufficient to achieve accuracy such that the errors are smaller than color differences typically noticeable to humans.

When the process performed by loop 830 terminates, the vector output by module 924 represents the spectrum of the specific medium used, which is needed to reproduce the supplied triplet of red, green and blue signals of the particular pixel. That is, the vector output by module 924 represents a spectrum $S(\lambda)$ which solves Equations 1a, 1b, 1c, and 2. This vector will typically have n values at the $n\lambda$ samplings. In an alternate embodiment, a different iterative approximation procedure may be used instead of the iterative convergence loop 830 disclosed herein to obtain a solution of the scanner equations 1a, 1b and 1c. The original spectrum to be reconstructed is given by Equation 3.

The colorimetric converter 850 implements a conventional and well known conversion of the pixel spectrum $S(\lambda)$ determined by loop 830 into colorimetric signals using the following formulae:

$$x = \int_\lambda S(\lambda)I(\lambda)X(\lambda)d\lambda \quad \text{(Equation 12a)}$$

$$y = \int_\lambda S(\lambda)I(\lambda)Y(\lambda)d\lambda \quad \text{(Equation 12b)}$$

$$z = \int_\lambda S(\lambda)I(\lambda)Z(\lambda)d\lambda \quad \text{(Equation 12c)}$$

where x, y and z are the CIEXYZ colorimetric values, $I(\lambda)$ is the spectral function of the selected illuminant and $X(\lambda)$, $Y(\lambda)$ and $Z(\lambda)$ are the color matching functions of the selected illuminant. In the preferred embodiment, the chosen illuminant is the D50 (5000K) proofing light, and the selected observer model is the 1931 CIE 2-degree standard colorimetric observer.

The operation carried out by the colorimetric converter 850 proceeds as follows. Referring again to FIG. 9, the spectrum vector output by module 924 after loop 830 terminates is first latched by latch 952 as indicated by signal L3 from module 926. This vector is further fed to module 964 where it is multiplied by the selected illuminant's spectral function $I(\lambda)$. The resulting vector is fed to module 966 where it is multiplied by each of the selected observer model's color matching curves $X(\lambda)$, $Y(\lambda)$ and $Z(\lambda)$, respectively. The resulting three vectors are fed to module 968 where they are integrated to give the final colorimetric signals. If desired, the CIEXYZ signals produced by module 968 may be converted to a different color space, such as CIELAB.

Figure 10:
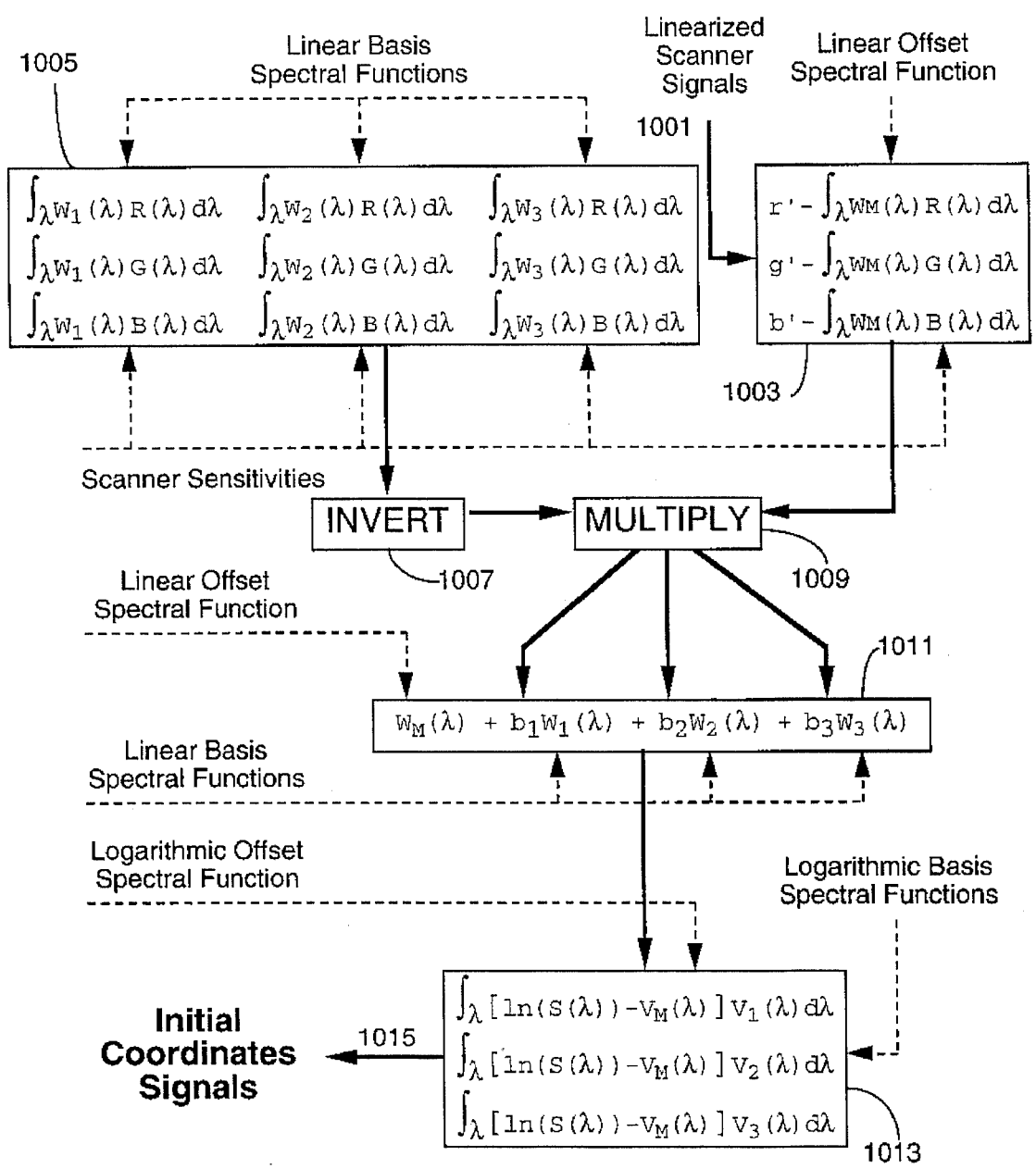
FIG. 10 is a schematic diagram of a system implementing the function performed by module 904 of FIG. 9 to determine the initial values of coordinates.

FIG. 10 schematically describes the preferred apparatus for carrying out the function of module 904 depicted in FIG. 9. This module determines initial values for the coordinate signals $a_1$, $a_2$ and $a_3$. First, an approximate representation with a linear vector subspace is used for the medium spectrum $S(\lambda)$. This approximation is given by Equation 8 above. The spectral functions $W_M(\lambda)$, $W_1(\lambda)$, $W_2(\lambda)$ and $W_3(\lambda)$ of Equation 8 are calculated using a procedure identical to the flow chart illustrated in FIG. 4, except that step 450 of applying a log function is omitted and thus these functions are linear basis spectral functions which are inputted to module 904. Substituting the right-hand side of Equation 8 instead of $S(\lambda)$ in the scanner equations 1a, 1b and 1c results in a set of three linear equations in the three unknowns $b_1$, $b_2$ and $b_3$. The latter unknowns are solved using any linear equation solving methods well-known in matrix algebra, and the approximate spectrum $S^*(\lambda)$ is then calculated using Equation 8. In the preferred embodiment, the values of $b_1$, $b_2$ and $b_3$ are obtained from the linearized scanner signals r', g' and b' Equation 9. Finally, the initial values for the coordinates $a_1$, $a_2$ and $a_3$ are produced using Equation 11a, 11b and 11c.

Referring now to FIG. 10, the scanner signals r, g and b, respectively, are first linearized to produce linearized scanner signals r', g' and b', respectively. These linearized scanner signals 1001, r', g' and b', are fed into module 1003 to obtain a 3×1 vector.

$$\begin{bmatrix} r' - \int_\lambda W_M(\lambda)R(\lambda)d\lambda \\ g' - \int_\lambda W_M(\lambda)G(\lambda)d\lambda \\ b' - \int_\lambda W_M(\lambda)B(\lambda)d\lambda \end{bmatrix} \quad \text{(Equation 13)}$$

Module 1005 comprises the calculation of the 9 elements of the 3×3 matrix M. The matrix M is inverted using module 1007 and further multiplied by the 3×1 vector using module 1009 to obtain the scalars $b_1$, $b_2$ and $b_3$ according to Equation 9 above. The scalars are then fed into module to calculate an approximate spectrum $S^*(\lambda)$, according to Equation 8 above. Further, the said spectrum is fed into module 1013 which calculates initial coordinate signals 1015, according to Equations 11a, 11b and 11c above.

In the preferred embodiment, the 3×3 matrix M as well as its inverse are calculated only once; there is no need to recompute each time a new set of linearized scanner signals 1001 are supplied to the apparatus. In a like manner, the entities $\int_\lambda W_M(\lambda) R(\lambda) d\lambda$, $\int_\lambda W_M(\lambda) G(\lambda) d\lambda$ and $\int_\lambda W_M(\lambda) B(\lambda) d\lambda$ in module 1003 and the entities $\int_\lambda V_M(\lambda) V_1(\lambda) d\lambda$, $\int_\lambda V_M(\lambda) V_2(\lambda) d\lambda$ and $\int_\lambda V_M(\lambda) V_3(\lambda) d\lambda$ in module 1013 are calculated only once.

FIG. 11 schematically shows the preferred apparatus for obtaining modification signals for the coordinates $a_1$, $a_2$ and $a_3$, that is, for carrying out the function of module 926 in FIG. 9. This uses the Newton-Raphson technique to produce modification signals $\Delta a_1$, $\Delta a_2$ and $\Delta a_3$, respectively, by which to modify the coordinates $a_1$, $a_2$ and $a_3$, respectively, at each iteration step according to the formulae of Equation 4a, 4b and 4c above. The modification signals are produced according to Equations 6 and 7 above.

Referring to FIG. 11, $S(\lambda)$, the currently estimated spectrum 1101 (from module 924), is fed into module 1103 to obtain the 9 elements of the 3×3 matrix N. The linearized scanner signals 1105, r', g', and b', together with the spectrum, are fed into module 1107 to obtain the 3×1 vector on the right hand side of Equation 6. Further, the matrix N is inverted by module 1109 and multiplied with the 3×1 vector by module 1111 to obtain the coordinate modification signals 1113.

Figure 12A:
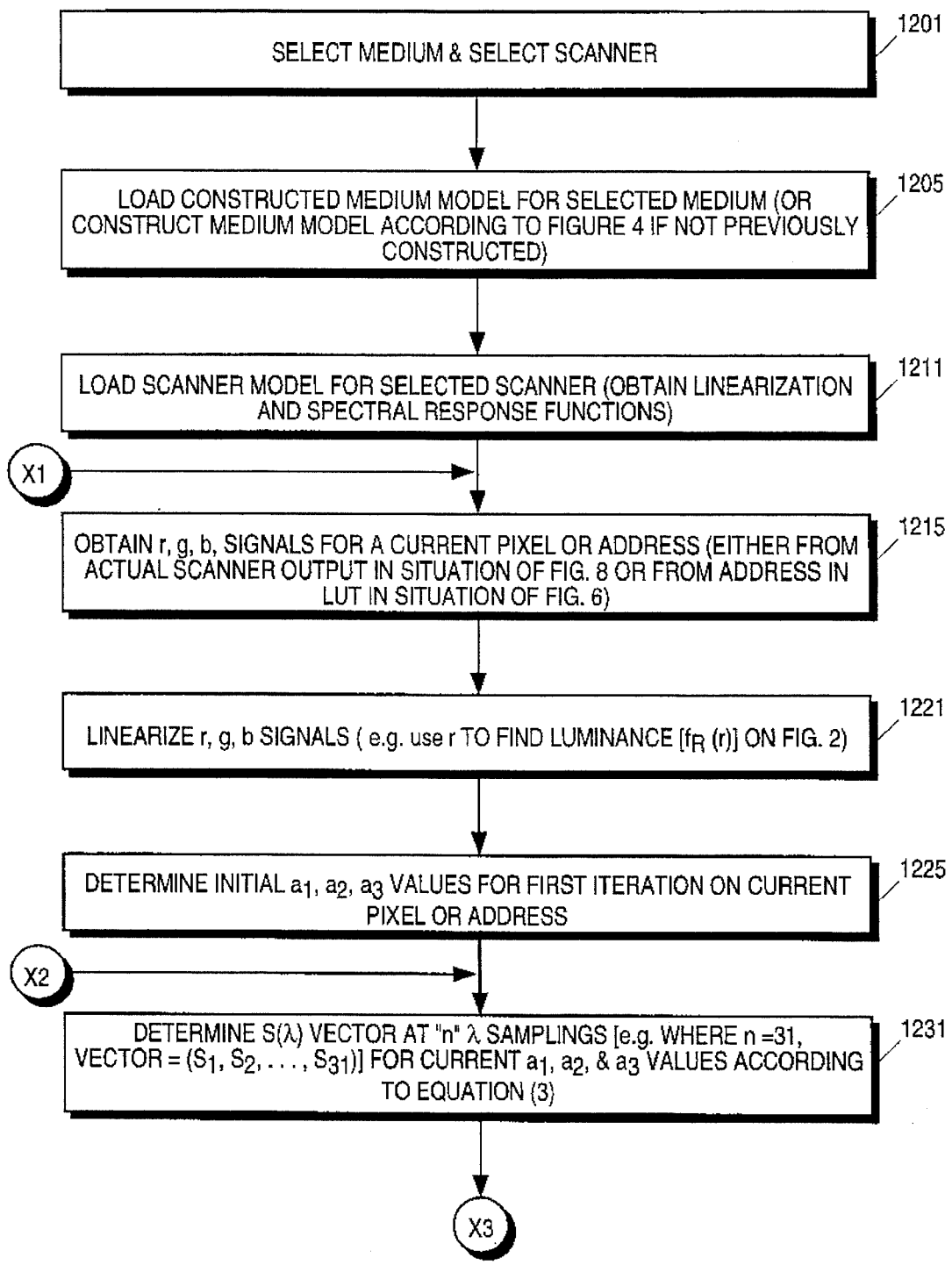
FIG. 12A and 12B are flow charts showing a method according to the invention for converting color signals from a color scanner to colorimetric signals representing colorimetric values.
Figure 12B:
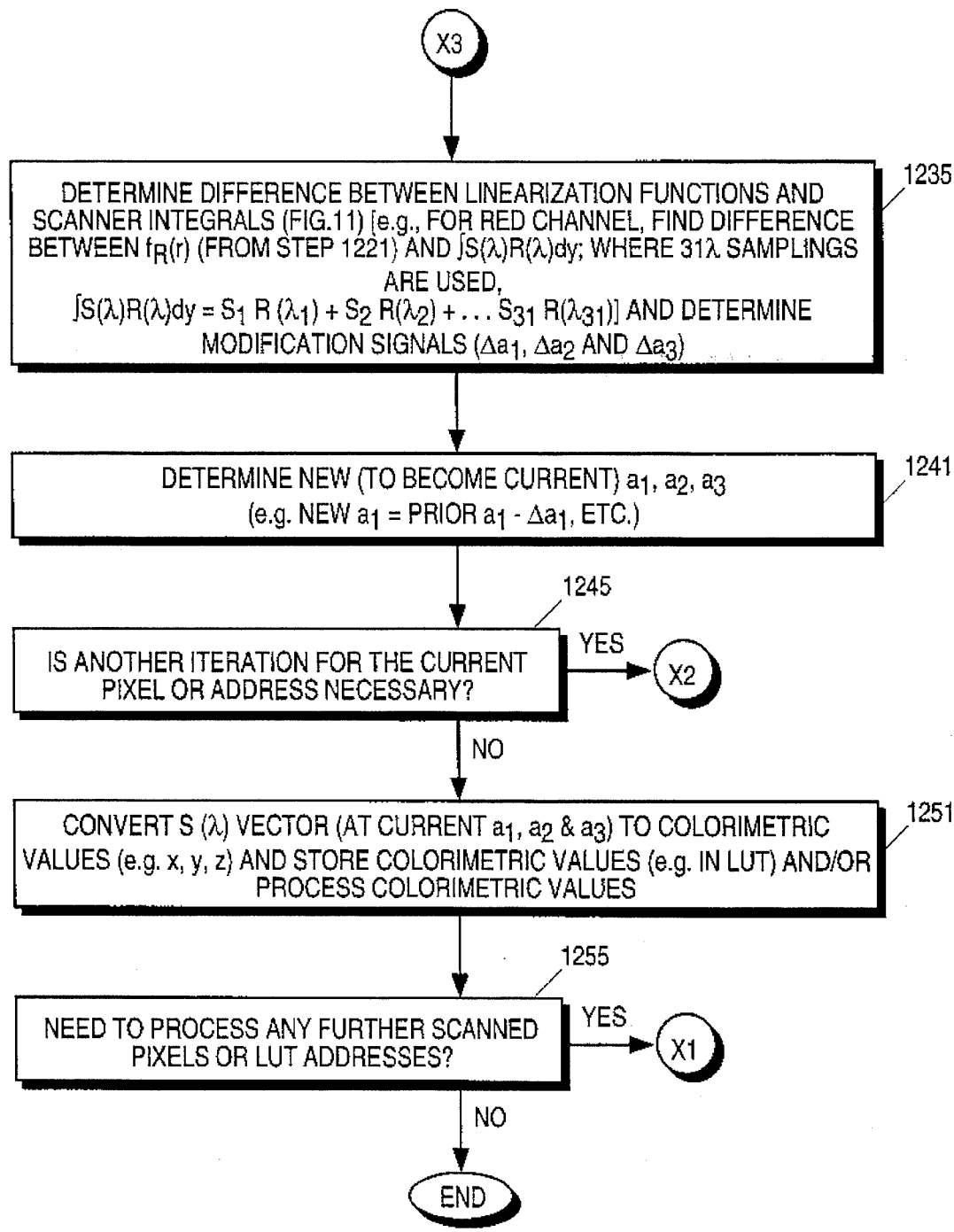

The invention will now be described in view of the flowcharts shown in FIGS. 12A and 12B. This flowchart describes a typical process performed according to the previously described embodiment of the invention, which may be implemented by a digital computer or digital hardware, such as, for example, the apparatus of FIG. 9. The process of FIGS. 12A and 12B begins at step 1201, wherein a selection of the medium and the scanner 104 is made; this typically is performed either by the user of the scanner or by some automatic method of identifying to the apparatus of the invention the particular medium (e.g. reflective print on a photographic paper of a certain manufacturer) and the particular scanner which will be (or has been) used to scan a color original. Several automatic methods will be apparent to those in the art. For example, such a method may involve having medium and scanner identification data embedded with the scanner signals. Whether the selection method is manual or automatic, typically, the apparatus of the invention will have a database of information for various particular media and scanners, where the database will include characteristics defining the media model or the actual basis spectral functions which comprise the media model and will further include characteristics (e.g. linearization functions and spectral response functions) which contribute to the scanner model. Selecting a particular medium and a particular scanner will cause the apparatus, as shown in steps 1205 and 1211, to obtain the appropriate media model (if already constructed) and the appropriate scanner model. If the exact media model or scanner model is not available, the user (or some automatic method) may select an available medium which most closely resembles the actual medium which is being scanned, although the results achieved will not be as accurate as if a media model for the desired medium were actually obtained according to the method of FIG. 4. If the media model has not yet been constructed (by e.g., determining the basis spectral functions according to FIG. 4), then the media model is determined in the manner described above. Typically, data representing the media model and the scanner model will be loaded into memory, such as, for example, memory 122, for processing by the CPU 120 of FIG. 1B.

In step 1215, the system obtains r, g, and b signals for a current pixel being scanned in the scanner 104. Then in step 1221, the system linearizes these r, g, b signals; this is typically performed by using the particular channel's signal (e.g. $r_1$) to find the corresponding Luminance using the channel's linearization function (e.g. curve 202 in FIG. 2). As shown in the embodiment of FIG. 9, this operation is performed in module 902.

In step 1225, the system determines initial values for the coordinates $a_1$, $a_2$ and $a_3$ for the first iteration on the current pixel or LUT address in the iterative convergence loop. As shown in the embodiment of FIG. 9, this operation is performed by module 904. Next, in step 1231, the system determines a vector representing $S(\lambda)$ for the current $a_1$, $a_2$, $a_3$ set of values for the current pixel or LUT address. Typically, this vector will be n elements at the n samplings over the desired wavelengths ($\lambda$); in a typical embodiment where n=31 samplings, this vector will have 31 elements $S_1$, $S_2$ ... $S_{31}$ determined by Equation 3 noted above. In the embodiment of FIG. 9, this vector is determined by module 924.

In step 1235, the system attempts to determine the error in solving the scanner model by using the media model. In effect, this error may be regarded as the differences between the given values of the linearization functions (e.g. from FIG. 2 or module 902 or step 1221) and the determined values of Equations 1a, 1b and 1c given the vector representing $S(\lambda)$ obtained from step 1231. Step 1235 also determines the modification signals ($\Delta a_1$, $\Delta a_2$ and $\Delta a_3$) for the coordinates $a_1$, $a_2$ and $a_3$; in the embodiment of FIG. 9, this operation is performed by module 926. In step 1241 the system determines the new values for coordinates $a_1$, $a_2$ and $a_3$ according to the modification signals provided in step 1235; in the embodiment of FIG. 9, this operation is performed by module 976. Then in step 1245, the system determines whether another iteration for the current pixel is necessary; in the embodiment of FIG. 9 this is performed by module 926. If a further iteration is necessary (determined as described above) then the process loops back to step 1231 and continues from there. If no further iteration is necessary then processing proceeds to step 1251, in which the spectral vector $S(\lambda)$ (e.g. from module 924 of FIG. 9) representing the current pixel is converted into colorimetric signals representing colorimetric values using well known techniques. In the embodiment of FIG. 9, step 1251 is performed by module 850. Then the system, in step 1255, determines whether further pixels require processing according to the invention. If so, then, processing loops back to step 1215, from which processing continues; otherwise the method is completed.

Rapid Processing Using a Lookup Table

In an alternate embodiment of the invention, the above embodiment corresponding to all or some of FIGS. 8, 9 10, 11 and 12 is used first to determine colorimetric values at a predetermined set of scanner signal values in order to construct a multidimensional lookup table (LUT) having these scanner signal values as inputs (addresses). To convert scanner signals, the LUT is used. If the scanner signals correspond to a LUT address, the corresponding colorimetric value is read from the LUT. Otherwise, multidimensional interpolation is used to determine an approximate colorimetric value form the colorimetric values corresponding of the nearest scanner signals that are addresses of the LUT.

Figure 6:
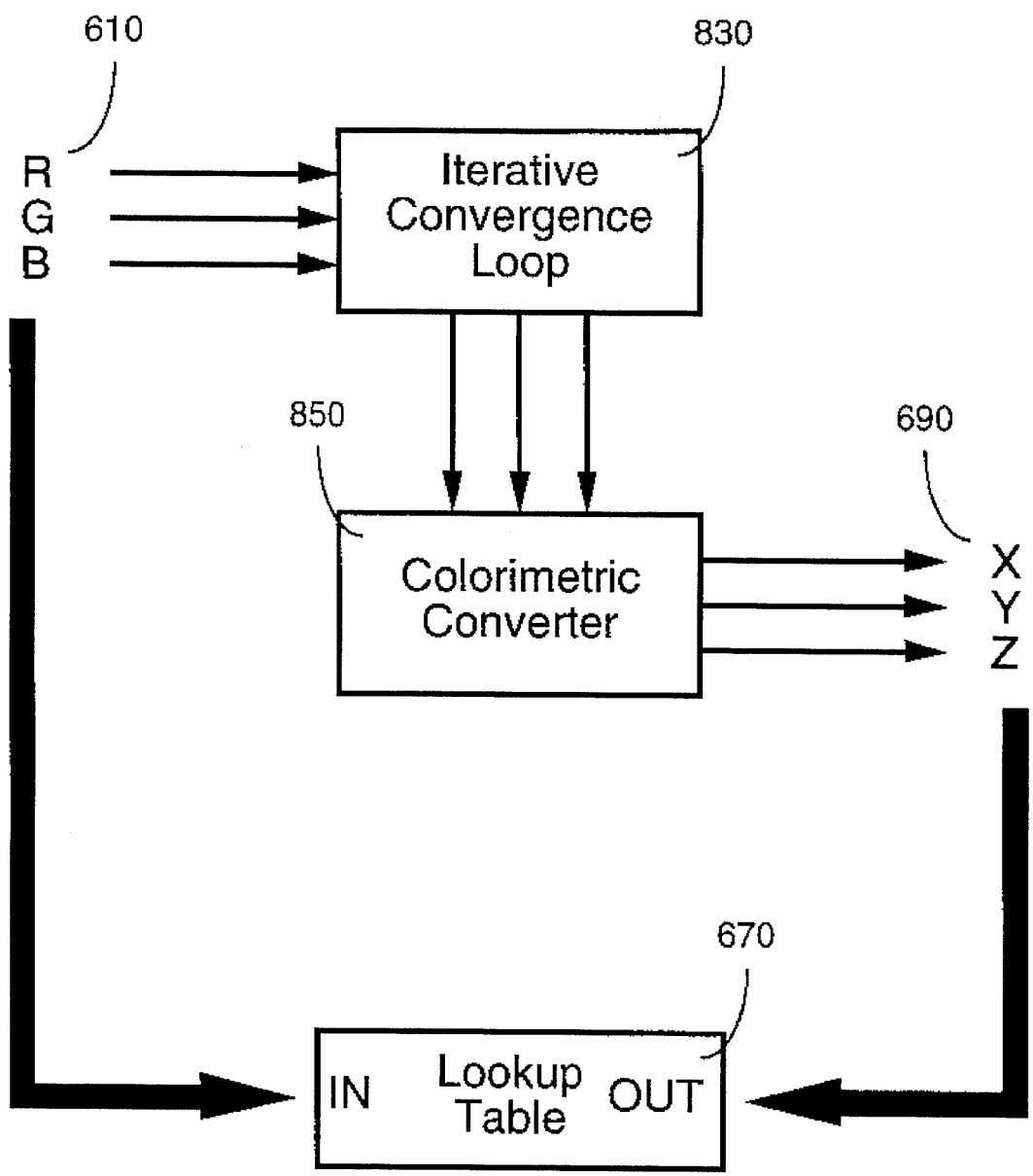
FIG. 6 is a schematic diagram of a system implementing the construction of a lookup table (LUT) using pairs of scanner signals and converted colorimetric values.

Referring now to FIG. 6, after the linearization functions (e.g. see FIG. 2) and spectral response functions (e.g. see FIG. 3) have been determined for scanner 104 and after the four representative spectral functions (e.g. see FIG. 5) have been determined for medium 102, a set of scanner signal values is determined for which to precompute colorimetric values to form entries of the LUT 670. Iterative convergence loop 830 may be used to produce spectrum values for each of the preselected scanner signal values. These spectrum values are then converted into colorimetric signals by colorimetric converter 850. LUT 670 may store the converted colorimetric data at table locations addressed by the set of scanner signal values. Typically, a set of scanner signals will be generated to provide a full set of addresses for all possible LUT locations.

In the preferred embodiment, scanner signal values are chosen which range from 0 to 255 in increments of 17, that is 16 steps per channel, in each of the red, green and blue channels. These scanner signals 610 are processed by the iterative convergence loop 830 according to the invention and the colorimetric converter 850 to obtain colorimetric signals 690, such as signals representing values in the CIEXYZ color space. The colorimetric signals are stored in LUT 670 at table entries addressed by the corresponding scanner signals. An alternative method for loading LUT 670 is to scan color samples of medium 102 by scanner 104. LUT 670, addressed by scanner signals corresponding to the color samples, will be loaded with the converted colorimetric signals.

Once the LUT is loaded, and in subsequent use of the LUT to lookup colorimetric values, it may be desired to use an invertible transformation, such as the logarithmic, exponential, or gamma function for the scanner signals prior to addressing LUT 670. This may be desired because of the particular scaling of the scanner signals for a particular scanner. Indeed, a separate invertible transformation may be used for each of the red, green and blue signal channels. In order to do so, the inverse of the transformation must be applied to the designated lookup table addresses and the inverse addresses must be supplied to the iterative convergence loop 830 instead.

In like manner, it may be desired to use an invertible transformation for the colorimetric signals obtained by the colorimetric converter prior to storing the signals as entries in LUT 670. For example, in the case where the LUT entries are loaded with RGB values that are intended to be viewed on a display, an exponential function matching the gamma of the display may be used to achieve faithful reproduction of the color. Again, a different invertible transformation may be used for each colorimetric signal channel. In order to do so, the transformation would be carried out as an additional last step of the colorimetric converter process.

Figure 7:
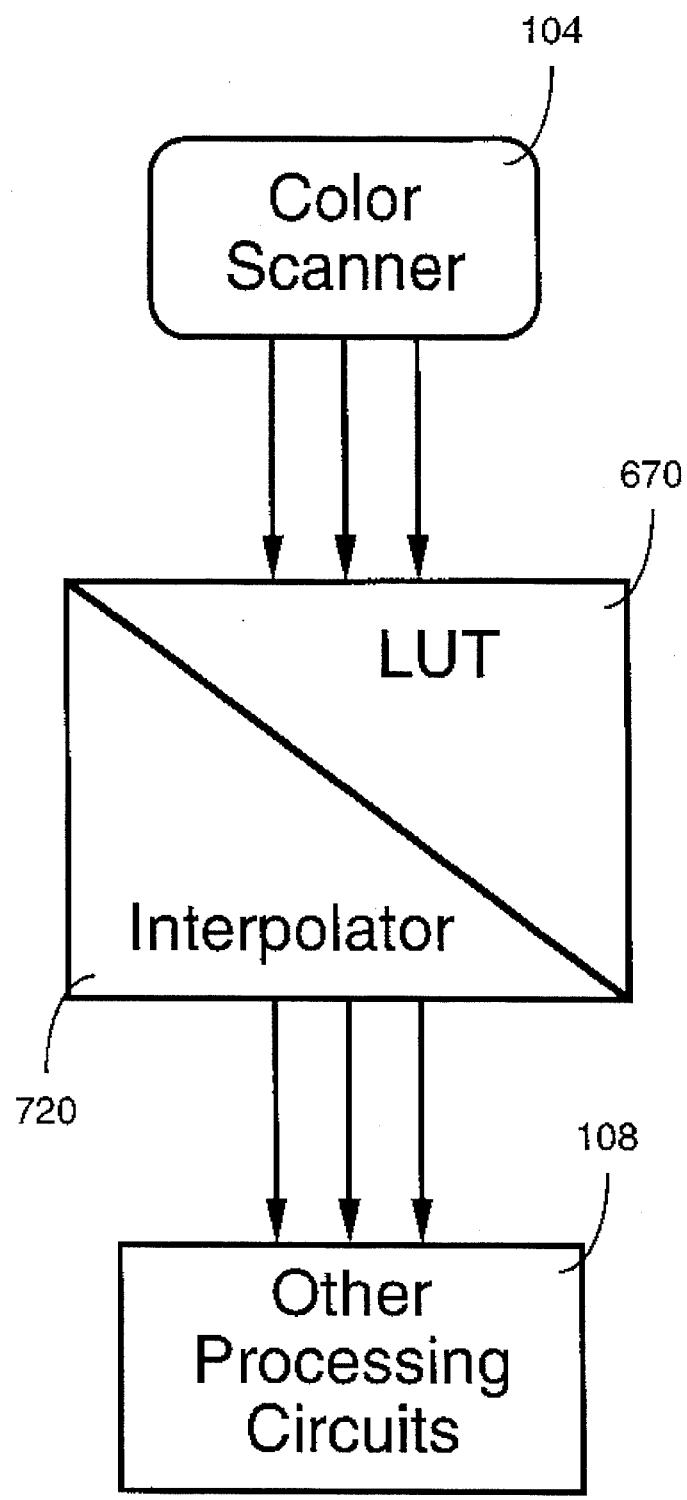
FIG. 7 is a schematic diagram of a system using the LUT constructed according to FIG. 6 to convert scanner signals into colorimetric values.

Referring now to FIG. 7, once the LUT is loaded, scanner signals originating from scanner 104 are, in one embodiment, converted into colorimetric signals using the loaded LUT 670 together with an appropriate three-dimensional (3-D) interpolation method carried out by interpolator 720. Examples of 3-D interpolation techniques include ordinary trilinear interpolation and any of the tetrahedral or other methods used for 3-D interpolation. In the embodiment illustrated in FIG. 7, the LUT 670 is loaded according to the method described in conjunction with FIG. 6, where scanner signal values are used as addresses to the LUT 670 and are used to produce, via the iterative convergence loop 830 and the colorimetric converter 850, colorimetric values which are stored in the LUT at the location addressed by the corresponding simulated scanner signals. It will also be appreciated that the LUT 670, once generated for a particular scanner and medium, may be stored in any memory device of a computer system, such as memory 126, and then, at a later time when the same scanner and medium are being used, retrieved and placed in memory 122 (which may be, for example, RAM) and used by the CPU 120 to convert color input signals from the scanner 104 into colorimetric values for subsequent storage or processing. It should be noted that when using a lookup table, inaccuracy is inevitable at table addresses representing scanner signals that are unrealizable for the medium for which the lookup table entries are derived. Furthermore, some error may be introduced by interpolator 720 which may not exactly predict entry values for intermediate addresses of LUT 670. The above-mentioned errors can be decreased by using more steps for LUT 670. In such an embodiment, 32 steps per channel are used. This requires more memory to store the larger number of entries in the LUT.

The method and apparatus of the present invention can be used for various types of color originals, such as slides, transparencies or reflective prints, by deriving a set of spectral basis functions, serving as a vector subspace for the logarithmic spectra typical of the particular medium of the original.

The method and apparatus of the present invention may be used with various types of scanners, such as transmittance scanners, reflectance scanners or any other photosensitive devices, so long as the spectral response characteristics of the scanner or device are known. In addition, the method and apparatus of the present invention may be used with scanners having other than three (e.g., red, green and blue) signal channels. This is done by using a different appropriate number of spectral basis functions and coordinates in Equation 3 to represent logarithmic spectra of scanned media. In general, the method and apparatus of the present invention may be used whenever the number of coordinates does not exceed the number of scanner signal channels. Maximum accuracy is expected when the number of scanner signal channels is equal to the number of coordinates being used.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A method of converting scanner signals from a scanner scanning an original on a medium into colorimetric signals, said method comprising the steps of:

(a) selecting a medium type representative of said medium of said original;

(b) producing a medium model for said medium type, said medium model having a set of basis spectral functions and parameters, said basis spectral functions determined by said medium type;

(c) producing a scanner model for said scanner;

(d) determining said parameters of said medium model from said scanner signals using said scanner model; and (e) determining a medium spectrum from said parameters using said medium model, said medium spectrum corresponding to said original on said medium and representing a conversion of said scanner signals.

2. A method as in claim 1 wherein said medium spectrum is further converted into colorimetric values.

3. A method as in claim 1 wherein the step of producing a medium model comprises the steps of (a) selecting a generic form of said medium model, set generic form comprising said set of basis spectral functions and said parameters;

(b) selecting a sample medium of said medium type;

(c) measuring spectra of said sample medium to form measured spectra; and (c) determining said set of basis spectral functions from said measured spectra.

4. A method as in claim 3 wherein said step of determining said set includes logarithmically transforming said measured spectra; said generic form is a linear expression of said set of basis spectral functions; and said parameters are weightings in said linear expression.

5. A method as in claim 4 wherein said step of determining said set of basis spectral functions includes using principal component analysis.

6. A method as in claim 3 wherein said step of determining said parameters comprises an iterative convergence loop developing a succession of values of said parameters, each instance of said values in said succession determined by the previous instance of said values in said succession.

7. A method as in claim 3 wherein said medium spectrum is further converted into colorimetric values.

8. A method of converting scanner signals from a scanner scanning an original on a medium into colorimetric signals, said method comprising the steps of:

(a) selecting a set of preselected scanner signal values, each of said scanner signal values representing an address to a multi-dimensional lookup table;

(b) selecting a medium type representative of said medium of said original;

(c) producing a medium model for said medium type, said medium model having a set of basis spectral functions and parameters, said basis spectral functions determined by said medium type;

(d) producing a scanner model for said scanner;

(e) determining said parameters of said medium model from said each of said scanner signal values using said scanner model;

(f) determining a medium spectrum from said parameters using said medium model, said medium spectrum corresponding to said original on said medium and representing a conversion of said each of said scanner signal values;

(g) converting said medium spectrum into corresponding colorimetric values for said each of said scanner signal values;

(h) storing said corresponding colorimetric values in said lookup table in a location corresponding to said address; and (i) converting said scanner signals into colorimetric values by addressing said lookup table.

9. A method as in claim 8 wherein said step of converting further includes interpolating between entries of said lookup table.

10. A method as in claim 9 wherein the step of producing a medium model comprises the steps of
   (a) selecting a generic form of said medium model, set generic form comprising said set of basis spectral functions and said parameters;
   (b) selecting a sample medium of said medium type;
   (c) measuring spectra of said sample medium to form measured spectra; and
   (c) determining said set of basis spectral functions from said measured spectra.

11. A method as in claim 10 wherein said colorimetric values are in the CIEXYZ color space.

12. An apparatus for converting scanner signals from a scanner scanning an original on a medium into colorimetric signals, said medium having a medium type representative of said medium of said original, said medium type having a medium model having a set of basis spectral functions and parameters, said basis spectral functions determined by said medium type, said apparatus comprising:
   (a) means for producing a scanner model for said scanner;
   (b) means coupled to said scanner and to said scanner model producing means, for determining said parameters of said medium model; and
   (c) means coupled to said parameters determining means, for determining a medium spectrum, said medium spectrum corresponding to said original on said medium and representing a conversion of said scanner signals.

13. An apparatus as in claim 12 further comprising means coupled to said spectrum determining means, for converting said medium spectrum into colorimetric values.

14. An apparatus for converting scanner signals from a scanner scanning an original on a medium into colorimetric signals, said apparatus comprising:
   (a) a memory;
   (b) a digital processor coupled to said memory, said memory storing a representation for a selected medium type representative of said medium of said original, said representation defined in a coordinate space, said coordinate space determined by said selected medium type, said representation providing a spectral description of said selected medium type, said memory storing a representation of said scanner, said digital processor producing a solution for said representation of a scanner using said representation of said medium type, wherein said solution is produced in said coordinate space.

15. An apparatus as in claim 14 further comprising a scanner coupled to said digital processor.

16. An apparatus as in claim 14 further comprising an input device, wherein said input device is used to select said selected medium type.

17. An apparatus as in claim 14 wherein said solution provides a spectral signal which represents a conversion of said signals representing output from said scanner.

18. An apparatus as in claim 17 wherein said spectral signal is further converted into a set of colorimetric values.

19. An apparatus as in claim 18 further comprising a scanner coupled to said digital processor.

20. An apparatus as in claim 19 further comprising a color printer coupled to said digital processor.

21. An apparatus as in claim 18 wherein said solution is produced iteratively in an iterative convergence loop, wherein said iterative convergence loop develops a succession of values in said coordinate space.

22. An apparatus as in claim 18 further comprising a multidimensional lookup table, said lookup table coupled to said memory, said scanner signals forming an address to said lookup table.

23. An apparatus as in claim 22 further comprising interpolation means, said interpolation means coupled to said lookup table.

24. An apparatus as in claim 14 wherein said representation of a selected medium type comprises a medium model having a set of basis spectral functions and parameters, said basis spectral functions determined by said selected medium type.

25. An apparatus as in claim 24 wherein said digital processor determines said parameters of said medium model from said scanner signals using said representation of said scanner and wherein said digital processor determines a medium spectrum from said parameters using said medium model, said medium spectrum corresponding to said original on said medium and representing a conversion of said scanner signals.

26. An apparatus for converting scanner signals from a scanner scanning an original on a medium into colorimetric signals, said medium having a medium type representative of said medium of said original, said medium type having a medium model, said medium model having a set of basis spectral functions and parameters, said basis spectral functions determined by said medium type, said apparatus comprising:
   (a) a first circuit producing a scanner model for said scanner;
   (b) a second circuit coupled to said-scanner and to said first circuit, said second circuit determining said parameters of said medium model; and
   (c) a third circuit coupled to said second circuit, said third circuit determining a medium spectrum, said medium spectrum corresponding to said original on said medium and representing a conversion of said scanner signals.

27. An apparatus as in claim 26 wherein said medium spectrum is further converted into colorimetric values.

28. An apparatus as in claim 26 further comprising a memory for storing a multidimensional lookup table, said scanner signals forming an address to said lookup table.

29. An apparatus as in claim 28 further comprising an interpolator coupled to said lookup table.

30. An apparatus as in claim 26 further comprising an input device and wherein said memory stores a plurality of medium types including said medium type and wherein said input device is used to select said medium type.

* * * * *